United States Patent [19]
Hall et al.

[11] Patent Number: 5,907,211
[45] Date of Patent: *May 25, 1999

[54] HIGH-EFFICIENCY, LARGE STROKE ELECTROMECHANICAL ACTUATOR

[75] Inventors: Steven R. Hall, Bedford; Eric F. Prechtl, Malden, both of Mass.

[73] Assignee: Massachusetts Institute of Technology, Cambridge, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/808,144

[22] Filed: Feb. 28, 1997

[51] Int. Cl.$^6$ .................................................. H01L 41/08
[52] U.S. Cl. .......................... 310/328; 310/331; 310/330
[58] Field of Search ..................................... 310/328, 331, 310/330, 333, 366, 346; 416/4

[56] References Cited

U.S. PATENT DOCUMENTS

| | | | |
|---|---|---|---|
| 4,193,703 | 3/1980 | Sakmann | 400/124 |
| 4,318,023 | 3/1982 | O'Neill et al. | 310/328 |
| 4,570,095 | 2/1986 | Uchikawa | 310/328 |
| 4,769,569 | 9/1988 | Stahlhuth | 310/328 |
| 4,808,874 | 2/1989 | Stahlhuth | 310/328 |
| 4,933,591 | 6/1990 | Stahlhuth | 310/328 |
| 4,952,835 | 8/1990 | Stahlhuth | 310/328 |
| 4,976,553 | 12/1990 | Yamaguchi et al. | 400/124 |
| 5,224,826 | 7/1993 | Hall et al. | 416/4 |
| 5,332,942 | 7/1994 | Rennex | 310/328 |
| 5,410,207 | 4/1995 | Miura et al. | 310/328 |
| 5,447,381 | 9/1995 | Kimura et al. | 400/124.16 |

OTHER PUBLICATIONS

Fenn et al., "Terfenol–D driven flaps for helicopter vibration reduction," *SPIE* vol. 1917, Smart Structures and Intelligent Systems, pp. 407–418, 1993.

Hall et al., "Development of a piezoelectric servoflap for helicopter rotor control," *Smart Mater. Struct.*, vol. 5, pp. 26–34, Feb. 1996.

Physik Instrumente, "Products For Micropositioning" Catalog, US Edition, PZ product page, Physik Instrumente, Germany, May 1995.

Patent Abstracts of Japan, vol. 009, No. 230 (E–343), Sep. 17, 1985.

*Primary Examiner*—Mark O. Budd
*Assistant Examiner*—Timothy A. Williams
*Attorney, Agent, or Firm*—Theresa A. Lober

[57] ABSTRACT

An actuator having two frames, each frame including a distal end member, a proximal pivot end member or proximal end pivot point, and at least two elongated side members connected between the distal end member and the proximal pivot end member of that frame. A flexure is disposed between an end of the pivot end member of the first frame and an end of the pivot end member of the second frame. A first longitudinal span member is disposed between the distal end member of the second frame and the pivot end member of the first frame, and a second longitudinal span member is disposed between the distal end member of the first frame and the pivot end member of the second frame. At least one of the first and second longitudinal span members is an expansive element having a longitudinal axis along which dimensional strain can be induced in response to an applied stimulus. This expansive element extends in a state of compression between the corresponding distal and proximal pivot end members, with the longitudinal axis of the element in a plane parallel to side members of the first and second frames. The one or both of the longitudinal span members that are expansive elements can be, e.g., a magnetostrictive element, an electrostrictive element, or a piezoelectric element. The actuator provides many of the characteristics required to achieve optimal mass efficiency for a given set of actuator materials; and further provides advantages of high bandwidth, linearity, and large stroke performance advantages. As a result, the actuator can be adapted to many applications and can accommodate a range of engineering constraints.

42 Claims, 7 Drawing Sheets

HIGH-EFFICIENCY, LARGE STROKE ELECTROMECHANICAL ACTUATOR

GOVERNMENT RIGHTS IN THE INVENTION

The United States Government has rights to this invention pursuant to Air Force Contract No. F49620-95-2-0097.

BACKGROUND OF THE INVENTION

This invention relates to electromechanical actuators, and more particularly relates to actuator configurations for enabling efficient, large stroke actuation.

Electromechanical actuators are employed in a wide array of engineering systems, ranging from aerospace and automotive applications to microfabrication and printing applications. Generally, actuators are included in such applications to generate force and effect displacement, for example, to open or close valves, to deflect transmission linkages, to position components, or to enable another such system function. Discrete actuators employed for such functions typically are designed to provide a desired actuation stroke over which a desired force is delivered to a given load. In one class of discrete actuators, an active element, i.e., an element that is actively stimulated by, e.g., electrical, magnetic, or thermal stimulus, is provided to generate the desired force, and a support frame or other member configured with the active element is provided to translate relative motion of the active element to a stroke having a related force for delivery to the load.

Based on this general discrete, active-element actuation mechanism, an actuator can be characterized by the level of energy it adds to or removes from the system in which it operates during the actuation stroke. Typically, energy must be supplied to the actuator from the system to enable the actuator stroke; specifically, energy is supplied to the active element to power generation of a force that is delivered through the stroke to a load, thereby producing work. A corresponding criterion for discrete actuator performance is generally based on efficiency of an actuator in converting energy input to its active element into the energy delivered by the actuator stroke. One metric for assessing this criterion is actuator mass efficiency, which is specified as the ratio of specific work delivered by an actuator to specific energy available to be supplied by the actuator's active elements.

Based on this energy relationship, the mass efficiency of a discrete actuator is directly related to the characteristic stiffness of the actuator, reflecting the fact that a stiff actuator load-bearing stroke mechanism is generally more efficient than a relatively more compliant stroke mechanism. Additionally, the actuator mass efficiency criterion is inversely related to the characteristic mass of an actuator, reflecting the fact that a relatively more massive stroke mechanism is generally more efficient than a less massive one. These mass efficiency considerations, both of which favor a more massive actuator, tend to be in direct conflict with the primary requirement of many engineering systems that the mass of an actuator incorporated in a such a system be minimized. But because engineering systems commonly require high actuator efficiency as well as low actuator weight, an explicit tradeoff in actuator design is typically required that often is suboptimal with respect to one or possibly even both requirements.

A wide variety of discrete, active-element actuator designs have been proposed in an effort to produce high-efficiency actuation mechanisms. For example, Hall and Spangler in U.S. Pat. No. 5,224,826, and Hall and Prechtl, in "Development of a piezoelectric servoflap for helicopter rotor control," Smart Mater. Struc., No. 5, pp. 26–34, 1996, have proposed an actuator, for helicopter rotor blade control, that employs an active monolithic piezoelectric ceramic bimorph structure cantilevered from a blade spar. The cantilevered structure is in turn connected to a trailing edge flap to be rotated by the actuator by way of a stroke mechanism incorporating three flexure points. While it is shown that tailoring of the bimorph structure can produce a relatively high actuator mass efficiency, the flexure points in the load-bearing actuation stroke path introduce parasitic compliance that inherently limits the attainable actuator mass efficiency, due to energy loss in bending, and for any actuator mass. In addition, the cantilevered monolithic bimorph structure, in which piezoelectric actuation is transverse to the applied electrical stimulus, is found to be characterized by an energy density that is considerably lower than that of a piezoelectric ceramic stack structure, in which piezoelectric actuation is parallel to the applied electrical stimulus.

While a piezoelectric ceramic stack structure indeed is characterized as an active actuation element having a high energy density, as well as a very high bandwidth, a piezoelectric stack structure is typically limited to only a relatively small stroke. As a result, a stroke amplification mechanism is generally required of an actuator incorporating such a structure. Ideally, an amplification stroke mechanism acts as nearly as possible like a true mechanism, i.e., it amplifies motion without resistance due to friction in hinges or other effects that impede mechanism motion, and it does not add compliance in series with the active element longitudinal expansion and contraction stroke path.

One discrete actuator employing an amplified-stroke ceramic stack configuration has been proposed by Kimura et al., in U.S. Pat. No. 5,447,381, among others. Here a piezoelectric stack is connected to a rigid support at one end and connected through a flexible member to a hinged fulcrum and lever structure at its other end. Expansion of the stack causes the fulcrum to rotate about the hinge away from the stack, in turn extending the lever, thereby translating the longitudinal stack expansion to a correspondingly amplified lever extension. Although this actuator provides a very effective stroke amplification mechanism, its lever design is inherently compliant, i.e., inefficient, in that it tends to bend against a load as the lever extends. Added mass is required to increase its stiffness and correspondingly increase its efficiency. Furthermore, realization of the hinge as a flexure that is located along the active element longitudinal expansion and contraction stroke path, as is conventional, introduces a high degree of parasitic compliance and energy loss that limits the actuator's efficiency for any selected mass.

The lever arm compliance of this fulcrum-lever design has been shown to be eliminated in a range of stack-based actuator designs that have been proposed, including, e.g., that of Stahlhuth in U.S. Pat. Nos. 4,808,874 and 4,952,835; and that of Fenn et al. in "Terfenol-D driven flaps for helicopter vibration reduction," SPIE V. 1917—Smart Struct. & Intell. Syst., pp. 407–418, 1993. In the Stahlhuth design, two active element stacks are positioned such that their longitudinal reaction creates an amplified perpendicular displacement of saggital linkages connected at ends of the stacks. In the Fenn design, two active element stacks are positioned to react longitudinally against each other at a shallow angle to create an amplified perpendicular displacement of a control rod connected between the stacks.

While overcoming the lever arm compliance of the lever design, both of these dual-stack actuator designs require at least one flexure to accommodate angular rotation of a stack or linkage relative to a support frame as the stacks longitudinally expand; indeed, several flexure points are required in each actuator. These flexures, being in the load-bearing stroke path, add significant parasitic compliance to the actuators and thus decrease the attainable efficiencies of the actuators for any selected actuator mass. The actuators are also rather complex and incompact in their configurations, thereby placing somewhat excessive space requirements on a system in which they are to operate. In addition, the Stahlhuth design requires compensation for thermally-induced excursions in its operation.

In another Stalhuth actuator design, similar to the Fenn actuator design described above and disclosed in U.S. Pat. No. 4,769,569, flexures at ends of the active element stacks are replaced by knife-edge rolling contact mechanisms. Although these contact mechanisms minimize flexural compliance, they are found to exhibit relatively high Hertzian losses due to their acute contact area. More importantly, this Stalhuth actuator employs a frame configuration in which the angle of the active element stacks, with respect to the horizontal, changes substantially over the course of one stroke cycle. As a result, the stroke amplification mechanism is very nonlinear, i.e., the stroke amplification factor changes during one stroke cycle. This nonlinearity is unacceptable for many high-precision applications, and in some cases can lead to a bifurcation of the active elements with respect to the frame.

These example actuator designs point out that actuator compliance is a predominant limitation conventionally associated with discrete actuator design inefficiency, due either to bending of a mechanism in the active element load path or to a hinge mechanism, such as a flexure, provided for accommodating rotational degrees of freedom in the active element load path. Compensation for bending with added actuator mass is often at odds with a given application weight limit, and cannot compensate for flexural compliance, which is parasitic and mass-independent. As a result, compromises in actuator performance specified for a given engineering application are often required to accommodate attainable actuator efficiency. Indeed, the example actuator designs illustrate that typically, an actuator configuration ultimately is limited to provide only one of low weight, high bandwidth, large stroke, or linearity performance advantages, but cannot well-address all four of these performance criteria will simultaneously meeting mass efficiency goals.

SUMMARY OF THE INVENTION

The present invention overcomes limitations of prior discrete actuator designs to provide an actuator design characterized by a high level of efficiency as well as a linear, high stroke amplification, a large stroke relative to actuator size, and a compact and uncomplicated configuration that provides ease of manufacture and low cost.

Accordingly, the invention provides an actuator having two frames, each frame including a distal end member, a proximal pivot end member or proximal end pivot point, and at least two elongated side members connected between the distal end member and the proximal pivot end member of that frame. A flexure is disposed between an end of the pivot end member of the first frame and an end of the pivot end member of the second frame. A first longitudinal span member is disposed between the distal end member of the second frame and the pivot end member of the first frame, and a second longitudinal span member is disposed between the distal end member of the first frame and the pivot end member of the second frame. At least one of the first and second longitudinal span members is an expansive element having a longitudinal axis along which dimensional strain can be induced in response to an applied stimulus. This expansive element extends in a state of compression between the corresponding distal and proximal pivot end members, with the longitudinal axis of the element in a plane parallel to side members of the first and second frames.

The one or both of the longitudinal span members that are expansive elements can be, e.g., a magnetostrictive element, an electrostrictive element, or a piezoelectric element, in the form, e.g., of a stack of piezoelectric ceramic wafers.

In embodiments provided by the invention, the two longitudinal span members are disposed between side members of the first and second frames, and the distal and proximal pivot end members of the second frame are each characterized by a width less than a width characteristic of each of the distal and proximal pivot end members of the first frame, wherein the side members of the second frame can be disposed between the side members of the first frame. Preferably, a longitudinal axis of each of the side members of the second frame is at a preselected angle from the longitudinal axis of the first longitudinal span member, and a longitudinal axis of each of the side members of the first frame is at the preselected angle from the longitudinal axis of the second longitudinal span member. The preselected angle corresponds to a preselected amplification factor relating stroke of the one or two expansive elements to transverse motion of the first frame distal end member relative to the second frame distal end member; preferable the selected angle is an acute angle.

In other embodiments, the distal end member of the first frame has a mounting end member adapted to be relatively fixedly mounted and the distal end member of the second frame has a displacement end member free to extend and retract along an actuator output stroke path. The mounting end member of the first frame can be adapted to provide an elongated actuator output stroke track having two separated side members between which the displacement end member of the second frame can operate.

In other provided embodiments, the actuator flexure is a cylindrical pivot point at the pivot end members of the first and second frames; this pivot point can be a cylindrical roller pin held in a state of compression between ends of the first and second frame pivot end members. The flexure can also be a hinge connected between an end of the first frame pivot end member and an end of the second frame pivot end member. The flexure can further be provided as a flexural support having a first support member connected to the first frame pivot end member, a second support member connected to the second frame pivot end member, a mounting plate, and a flexible strut connected between the mounting plate and each of the first and second support members through corresponding first and second flexural links.

In preferred embodiments, the first longitudinal span member abuts the pivot end member of the first frame with a rolling contact, and the second longitudinal span member abuts the pivot end member of the second frame with a rolling contact. Each rolling contact can be provided as, e.g., a cylindrical or spherical endcap that abuts the corresponding pivot end member. The longitudinal span members can include an endplate or spherical endcap, e.g., that abuts the distal end member of the corresponding frame. A pre-load spring is preferably provided connected to bias the first and second longitudinal span members in a state of compression.

In other preferred embodiments, the first and second frames are each of a frame material characterized by a specific modulus that is greater than a specific modulus characteristic of each of the first and second longitudinal span members. Additionally, the first and second frames are each preferably of a frame material characterized by a coefficient of thermal expansion that is between about 0.5 and about 1.5 times the average of the coefficients of thermal expansion characteristic of each of the first and second longitudinal span members. In one preferred embodiment, each of the first and second frames is of a matrix-fiber composite frame material having a volume fraction of fiber material and a corresponding volume fraction of matrix material selected to produce a frame coefficient of thermal expansion that substantially matches the average of the coefficients of thermal expansion characteristic of each of the first and second longitudinal span members.

In other embodiments, a displacement sensor is connected along a path of the second frame distal end extension for sensing displacement of a load connected along the path. In this scenario, a controller is connected in a feedback loop between the displacement sensor and the expansive elements for controlling the stimulus applied to each of the expansive elements to produce a desired displacement of the load. In addition, a force sensor can be provided in communication with at least one of the two frames for sensing force produced by extension of the second frame distal end; here a controller is connected in a feedback loop between the force sensor and the expansive elements for controlling the stimulus applied to the elements to produce a second frame distal end extension having a desired force. Further, a displacement sensor can be connected along a path of the second frame distal end extension, for sensing displacement of a load connected along the path, and a force sensor can at the same time be provided in communication with at least one of the frames for sensing force produced by extension of the second frame distal end. A controller connected in a feedback loop between the force and displacement sensors and the expansive elements can then be employed for controlling the stimulus applied to the expansive elements to produce a desired second frame distal end extension stiffness.

In other aspects, the invention provides that the actuator be employed for controlling a deflectable trailing edge flap of an airfoil. Here the first frame has a distal end and a proximal end pivot point and the second frame has a distal end and a proximal end pivot point coincident with the pivot point of the first frame. A flexural support is connected to each of the first and second frame pivot points and mounted to the airfoil, with the first and second frames located within the airfoil. First and second expansive elements are provided, each having a longitudinal axis along which dimensional strain can be induced in response to an applied stimulus, and each extending in a state of compression between the first and second frames such that a stimulated change in each expansive element length reacts against a proximal end of one of the first and second frames to induce pivoting of the first and second frames relative to each other, resulting in extension of the second frame distal end with respect to the first frame distal end in a direction transverse to the longitudinal axes of the expansive elements. A control rod is engaged with the distal end of the second frame and extends through the airfoil to engage a lever mounted to the airfoil trailing edge flap.

In preferred embodiments, a pre-load element is connected to bias the first and second expansive elements in a state of compression; for example, a torsionally pre-stressed wire can be connected between the airfoil and the trailing edge flap. The flexural support of the actuator is preferably a centrifugal support having a first support member connected to the first frame, a second support member connected to the second frame, a mounting member, and a flexible strut connected between the mounting plate and each of the first and second support members through corresponding first and second flexural links for distributing centrifugal force equally between the first and second frames. The distal end of the first frame can be adapted to provide an elongated actuator stroke track having two separated side members between which the distal end member of the second frame can operate.

The actuator of the invention provides many of the characteristics required to achieve optimal efficiency for a given set of actuator materials. No flexures are required to enable reaction of expansive elements against the frames; the rolling contacts of the actuator elements, held in compression throughout the stroke cycle, do not incorporate compliance along the stroke load-bearing path, although they do slightly reduce the actuator efficiency due to Hertzian losses characteristic of such rolling contacts. It is found, however, that the slight Hertzian losses are overshadowed by the large reduction in compliance achieved with the contacts. The pivot mechanism between the pivot ends of the frames is located at a cross member of a truss geometry formed by the actuator; this is a low-force leg of the actuator load-bearing stroke path relative to the expansive elements' stroke paths. As a result, the compliance of the pivot mechanism does not substantially increase overall compliance along the expansive elements' stroke paths, and accordingly, does not reduce the mass efficiency of the actuator. The form factor of the actuator of the invention is also particularly superior. The actuator design is inherently compact and can be easily accommodated in various cavities. The actuator does not require complicated manufacturing or construction operations, and can be produced from any of a wide range of frame materials selected to suit a particular application.

Beyond the rotor blade flap control application described above, the actuator of the invention is particularly well-suited to a wide range of applications. While conventional actuators commonly exhibit one of high mass efficiency, high bandwidth, linearity, or large stroke performance advantages, the actuator of the invention provides all four of these advantages, in addition to providing a compact actuator size, uncomplicated geometry, and ease of manufacture, and importantly, a wide scaling range. As a result, the actuator of the invention can be adapted to many applications and can accommodate a range of mechanical and operational engineering system constraints. Other features and advantages of the invention will be apparent from the claims, and from the following description and accompanying drawings.

DETAILED DESCRIPTION OF THE INVENTION

Figure 1A:
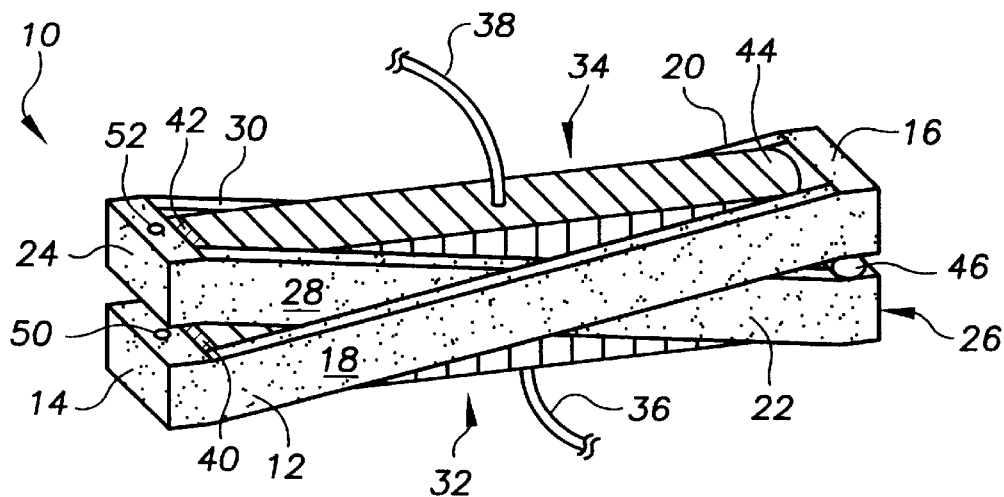
FIG. 1A is a perspective view of the actuator of the invention.
Figure 1B:
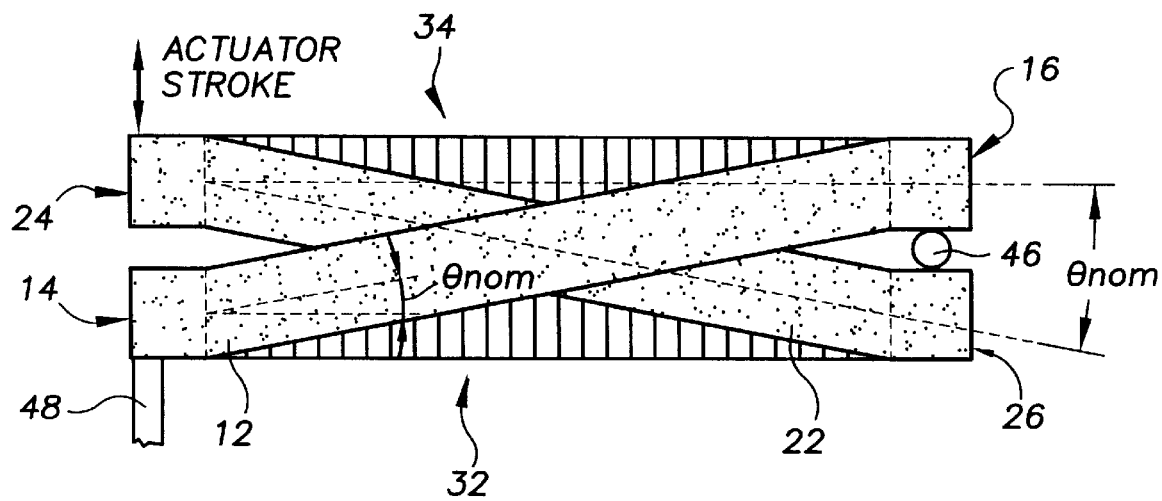
FIG. 1B is a side view of the actuator of FIG. 1A.

FIGS. 1A and 1B show perspective and side views, respectively, of a first example implementation of an actuator 10 configured in accordance with the invention. The actuator includes an outer frame 12 formed of a mounting end plate 14 and a pivot end plate 16 connected by two stiff side members 18, 20. An inner frame 22 is provided, similarly formed of a displacement end plate 24 and a pivot end plate 26 connected by two stiff side members 28, 30. A first electrically-stimulated, i.e., active, expansion element, such as a piezoelectric stack 32, shown only schematically in the figures, is connected between the mounting end plate 14 of the outer frame 12 and the pivot end plate 26 of the inner frame 22, while a second active expansion element such as a piezoelectric stack 34, also shown only schematically in the figures, is connected between the pivot end plate 16 of the outer frame 12 and the displacement end plate 24 of the inner frame 22. The width of the end plates 24, 26, of the inner frame 22 are more narrow than that of the end plates 14, 16, of the outer frame 12, such that the inner frame can be slid within the outer frame to accommodate these dual-frame stack connections. As shown particularly in FIG. 1B, the side members of each of the two frames are connected to the respective frame end plates at a selected angle, $\theta_{nom}$. This geometry enables an "X" frame configuration in which the inner frame 22 is positioned at the selected angle, $\theta_{nom}$, with respect to the second stack 34, and the outer frame 12 is likewise positioned at the selected angle, $\theta_{nom}$, with respect to the first stack 32.

In accordance with the invention, the "X" frame configuration of the inner and outer frames and the first and second stacks acts to maintain each contact point between the stacks and frames in mechanical compression, whereby rolling-type, friction force contacts, rather than flexural contacts, can be employed between the stacks and the frames, to thereby minimize parasitic flexural compliance of the actuator. As explained in detail below, a pre-load mechanism such as a spring is suitably connected to maintain the mechanical compression of the active element stacks.

With this provision, the first stack 32 thus abuts the mounting end plate 14 of the outer frame 12 by way of a suitable stiff panel such as a stack end plate 40 and similarly, the second stack 34 abuts the displacement end plate 24 of the inner frame 22 by, e.g., a stiff stack end plate 42; no fastener connection is required between the frame and the end plate. At the pivot end plates 16, 26, of the outer and inner frames, each of the stacks 32, 34, are preferably provided with a rolling contact mechanism such as a cylindrical endcap 44, or other suitable rolling contact mechanism such as a spherical endcap or other conventional rolling contact mechanism. While a fastener connection is not required between the endcaps and pivot end plates, as can be recognized, a connector pin, e.g., a tapered pin that allows for rotational motion but provides transverse retention, can be employed with any of these configurations.

For many applications, spherical endcaps are preferred because they constrain the stacks to be axially loaded, and thus minimize compliance losses due to eccentric loading of the stacks. As can be recognized, if the stacks can be perfectly aligned and the frames perfectly machined, then flat stack end plates and cylindrical endcaps are preferred; spherical endcaps, provided at both ends of the stacks, accommodate imperfections of the stacks and frames. In addition, as can be recognized, the end plates of the frames can be provided with a suitable corresponding geometry, e.g., a loose dimple geometry or other geometry that mates with the selected endcap geometry. Whatever end plate geometry is provided, this geometry preferably constrains the stacks in the plane of the frames such that the stacks do not move laterally with respect to the frames; a transverse connector like that described above is particularly well-suited in this regard.

Preferably, the stiff end plates and rolling endcaps of the stacks are as thin as possible, given mechanical considerations, to maximize the stack length available for actuation between the corresponding frame end plates. The unstimulated length of each stack, including its end plate and endcap, preferably is equal to the distance between the frame endplates which that stack abuts. Electrical connections 36, 38, are provided to the first and second stacks 32, 34, respectively, for enabling electrical stimulation of the stacks.

As shown in the figures, a roller pin 46, or other flexural connection such as a hinge or flexure, is provided between the pivot end plates 16, 26, of the inner and outer frames 12, 22. If a loose rolling mechanism such as a pin is employed, the pin is inherently held between the end plates by the compressive stress of the frames, which pinch against the pin. As can be recognized, a retaining mechanism can be provided in conjunction with the pin to constrain the pin from slipping out between the frames along its longitudinal axis. The diameter of the pin is selected to maintain the selected angle, $\theta_{nom}$, between each stack and the corresponding inner or outer frame. Alternative to a loose rolling mechanism, one of the pivot end plates can be provided with a cylindrical edge feature or other member that provides a rolling or hinge pivot point.

With this configuration, actuation of the stroke mechanism of the actuator is enabled by retaining the mounting end plate 14 of the outer frame 12 fixed to a stationary reference frame (not shown) by, e.g., a mounting rod 48 connected between, e.g., a hole 50 in the mounting end plate and a fixed structure. As shown in FIG. 1B, the displacement end plate 24 of the inner frame 22 is maintained free to deliver the actuator stroke. While the actuator stroke is represented in the figure as being vertical, it is to be understood that the actuator can be positioned to deliver actuator stroke extension in any desired direction. A rod, hook, or other connection mechanism can be mounted to the displacement end plate 24 by way of, e.g., a mounting hole 52 in the displacement end plate, for delivering force through the actuator stroke to an output load.

In operation, each of the two stacks is electrically stimulated to expand by application of an appropriate electrical voltage individually to the stacks. In response to the stack expansion, and given that the points of contact between the frames and stacks are held together in compression, the stacks slightly pivot about their rolling contacts, to react against the corresponding frame end plates, with the inner frame displacement end plate 24 thereby rotating counterclockwise relative to the inner frame pivot end plate 26. Conversely, the outer frame mounting end plate 14 cannot translate by virtue of its fixed mounting. As a result, the inner frame pivots with respect to the outer frame on the roller pin 46, thereby effecting a downward stroke of the inner frame displacement end plate 24. Application of an appropriate electrical voltage for stack contraction produces a corresponding reverse stroke of the inner frame displacement end plate. Here, stack contraction causes a reaction against the inner and outer frames such that the inner frame displacement end plate 24 rotates clockwise relative to the inner frame pivot end plate 26. The inner and outer frames then pivot on the roller pin 46 to effect an upward extension stroke of the inner frame displacement end plate 24. Note that the roller pin allows the frames to rotate while maintaining a constant separation between the centerlines of the frames.

Figure 2A:
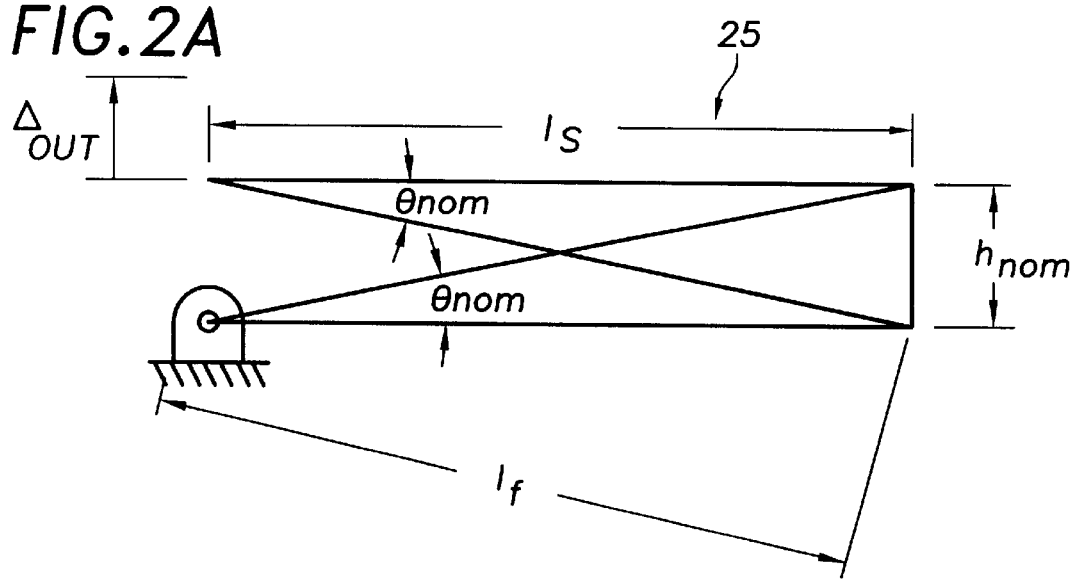
FIG. 2A is a schematic diagram of the geometric truss produced by the actuator configuration of FIGS. 1A–1B.

The translation of longitudinal stack expansion and contraction into corresponding actuator stroke extension and retraction by the actuator frame and stack configuration provides a stroke amplification factor that is substantially constant over the stroke cycle, i.e., is substantially linear. Referring to FIG. 2A, this linear stroke amplification can be geometrically defined based on a representation of the frame configuration as a truss structure 25, with the mounting end plate of the outer frame grounded, the stacks providing horizontal members, each of a stack length, $l_s$, the frames interconnecting ends of the stacks, each frame of a frame length, $l_f$, and with the roller pin or other hinge mechanism providing a cross member of constant height, $h_{nom}$, between the frames' centerlines at their pivot ends.

Figure 2B:
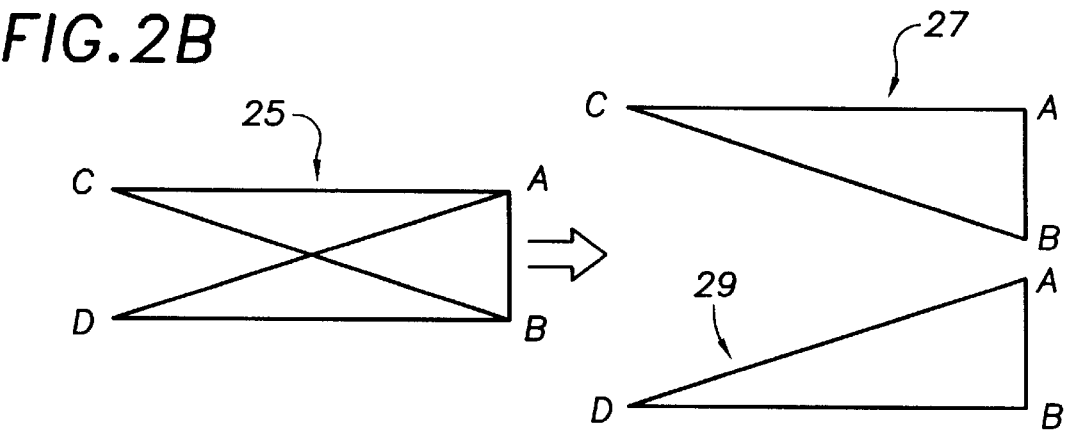
FIG. 2B is a schematic diagram of the geometric truss of FIG. 2A deconstructed into its component triangles.

Referring also to FIG. 2B, the representational actuator truss 25 can be deconstructed into its components, namely, an upper triangle 27 formed of one stack, one frame, and the cross member, and a lower triangle 29 formed of the other stack and frame and the same cross member. Points A, B, C, and D of the triangles correspond to the same labeled vertices of the truss.

Figure 2C:
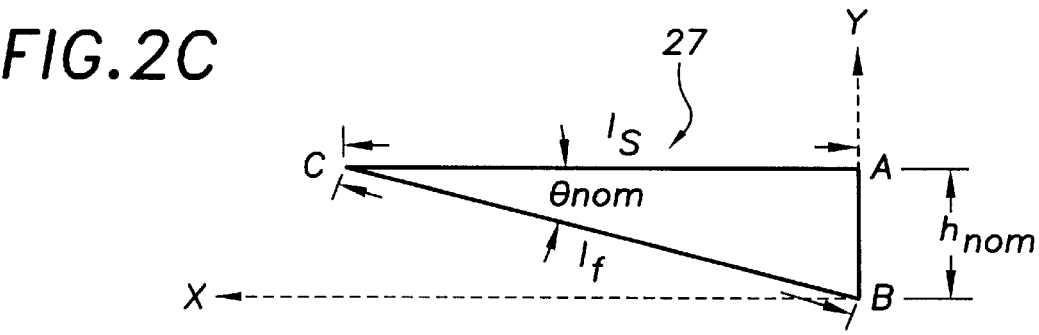
FIG. 2C is a schematic diagram of one of the component triangles of FIG. 2B shown positioned in an x-y coordinate system.

Considering one of the component triangles, e.g., the upper triangle 27, as shown in FIG. 2C, it is specified that the point of intersection of the cross member, of height $h_{nom}$, and the stack member is vertex A, and the intersection of the cross member and the frame is vertex B. Under free-loading conditions, the frame member is unloaded and thus remains at a constant frame length, $l_f$, as the stack element contracts and expands in response to electrical stimulation. As the stack length changes, the stack and frame are forced to rotate about points A and B, respectively, until a geometric equilibrium is reached. In the case of stack expansion, the path along which the end of the stack travels as it expands can be expressed in the coordinate system of FIG. 2C as:

$$y_s = \sqrt{l_{s\Delta}^2 - x^2} + h_{nom}; \quad (1)$$

where x is defined in the coordinate system, $y_s$ is the y-coordinate corresponding to the end trajectory of the stack element end point C, and $l_{s\Delta}$ is the elongated stack length.

The elongation of a stack such as a piezoelectric stack is in turn related to the strain, $\epsilon$, induced in the stack by an applied electric field, as:

$$l_{s\Delta}=l_s(1+\epsilon); \quad (2)$$

where the undeformed stack length, $l_s$, corresponds to an induced strain, $\epsilon$, of zero.

The path along which the frame is constrained to move as the stack elongates is given as:

$$y_f = \sqrt{l_f^2 - x^2}; \quad (3)$$

where $y_f$ is the y-coordinate corresponding to the end trajectory of the frame end point C. Because this frame endpoint is in fact also the stack endpoint, relations (1) and (3) can be set equal to each other, i.e., $y_s=y_f$. With this equality of relations (1) and (3), and employing the triangular relation that $l_f^2=h_{nom}^2+l_s^2$, it is found that:

$$y_s = y_f = -\frac{l_s}{h_{nom}}(1+\frac{\varepsilon}{2})(l_s\varepsilon); \quad (4)$$

which expresses a relation for actuator stroke length as a function of stack extension, $l_s\epsilon$, multiplied by an amplification factor given as:

$$-\frac{l_s}{h_{nom}}(1+\frac{\varepsilon}{2}). \quad (5)$$

Turning back to FIGS. 2A–2B, it is seen that the two component triangles of the actuator truss structure contribute the amplification factor of relation (5), and thus the overall free amplification factor, A, of the actuator is given as:

$$A = -\frac{2l_s}{h_{nom}}(1+\frac{\varepsilon}{2}). \quad (6)$$

Note that the only factor in this relation that is not constant is the induced stack strain, $\epsilon$. As a result, the percent change of the free amplification factor, A, is given as about $(\epsilon/2)100\%$, considering that there are two stacks. Given that piezoelectric stacks typically operate over a strain range of between about zero and about $1650\times10^{-6}$, the corresponding maximum change in the amplification factor is only about 0.08% over the entire range of induced strain. Thus, the actuator configuration is shown to be of very high linearity. This linearity is directly related to the fact that the stack/frame angle, $\theta_{nom}$, of each truss triangle remains substantially constant as the stacks and frames move; i.e., the truss-like structure provides a dimensional ratio on which to base an amplification factor that is substantially constant over the entire range of actuation stimulation. This renders the actuator of the invention as a superior alternative to previous actuator configurations that exhibit large nonlinearities in their operational stroke amplification.

Given that the actuator stroke amplification is solely dependent on the selected actuator triangular truss geometry, and thus the selected angle, $\theta_{nom}$, between the actuator stacks and frames, a selected amplification factor can theoretically be implemented in any desired actuator size as long as all components of the actuator are proportionally scaled, i.e., geometrically scaled, for the desired size. Indeed, in theory, there is no minimum or maximum limit to the size of the actuator under a constraint of geometric scaling. In practice, such scaling implicitly assumes that the applied voltages and corresponding electric fields applied to a given scaled stack length are also scaled to maintain a given electric field strength in the stacks. However, the maximum achievable voltage across a wafer in a conventional active stack element formed of a stack of wafers is typically limited, whereby additional stack wafers can be required to produce the given electric field at a selected actuator size. Because each stack wafer incorporates an additional stack bond layer, as described below, which in turn increase stack compliance, such additional stack wafers can decrease the actuator efficiency. As a result, the practical design of relatively larger actuators requires a tradeoff between desired voltage scaling and stack stiffness as it relates to actuator efficiency. A range of application-specific actuator sizes will be described later in the discussion.

For a given actuator size, a desired stroke amplification factor can be obtained by providing inner and outer frames having a selected angle, $\theta_{nom}$, as defined above, that corresponds to the desired frame-to-frame cross member height, $h_{nom}$, and the corresponding amplification factor. Several operational factors are preferably considered, however, in this angle selection. Primarily, a selected angle should be evaluated for its impact on clearance between the displacement end of the inner frame and the mounted end of the outer frame when the actuator stroke retracts the inner frame displacement end back toward the outer frame mounted end. Some actuator size-angle combinations for a given level of maximum induced stack strain can result in an amplification factor that causes the inner frame to collide with the mounted outer frame at a point during the stroke retraction, and as can be recognized, such would impact the energy loss and efficiency of the actuator. Preferably, the actuator design is selected with such clearance issues considered.

In one example design scenario, the end plates of each frame are assumed to be of a height that is approximately equal to the diameter, D, of the stacks. Then, as the selected angle, $\theta_{nom}$, is decreased, or equivalently, as the length to diameter ratio of the stacks is increased, the amplification factor of the actuator stroke is increased. A clearance gap for the retracted stroke position is then proportionally accommodated by specifying that the distance between the centerlines of the frames at the pivot end of the frames, $h_{nom}$, be increased in proportion to increases in amplification. This relationship can be stated for a given stack length to diameter ratio, and corresponding amplification, as:

$$h_{nom} > D + \frac{2}{\tan\theta_{nom}} \varepsilon_{max} l_s; \qquad (7)$$

where $\varepsilon_{max}$ is the given maximum strain characteristically induced in the stacks.

In addition to hard geometric limits imposed by the actuator stroke mechanism, the design of the actuator also preferably provides consideration for the degree of active stack element end support necessary to prohibit buckling along the length of the stack between the frame end plates. For cylindrical stacks, the relationship between the ratio of stack length to diameter, $l_s/D$, and instantaneous stack strain, $\varepsilon$, is given as:

$$\frac{l_s}{D} = \frac{\pi}{4\sqrt{\varepsilon f_s}}; \qquad (8)$$

where $f_s$ is a safety factor appropriate for a given application of the actuator. This relationship provides a buckling constraint on the stack length to diameter ratio based on a desired maximum stack strain. It is to be recognized that this relationship does not account for eccentric loading of the stacks, which condition can exacerbate buckling tendency. In general, it is preferred that actuator size and amplification design selections be made with full appreciation of the buckling and compliance characteristics of a selected stack configuration.

Turning now to materials considerations, the actuator of the invention can be configured using any actuation element that is capable of producing expansion and contraction along a longitudinal axis of the element. The class of active, i.e., electrically-stimulated, elements are for many applications preferred because active materials are generally characterized by reasonably high energy densities and large actuation bandwidth capabilities. In addition, the electrical control required to be delivered to active materials can generally be accommodated even in complex actuator applications such as rotor blade applications.

A range of active materials, including piezoelectric ceramics, magnetostrictive alloys, shape memory ceramics, and electrostrictive ceramics, as well as other active materials, are all suited to the actuator configuration. Whatever active materials are candidate for a given application of the actuator, it is preferred that considerations of energy density, supported strain, bandwidth, longevity, actuation linearity, thermal sensitivity, cost, technical maturity, and other suitable factors be evaluated in selecting an active material for the application. For example, electrostrictive ceramics, having a low energy density and high degree of actuation nonlinearity relative to other active materials, may be less desirable in some actuation applications. Similarly, the limited bandwidth as well as technical immaturity of shape memory ceramics relative to other active materials may render shape memory ceramics less desirable for some actuation applications.

Piezoelectric ceramics, electrostrictive ceramics, and magnetostrictive alloys all are generally characterized by relatively high energy density, high actuation bandwidth, and technical maturity, but all generally display some degree of actuation nonlinearity, as well as low durability and generally high actuation voltage and current levels. But magnetostrictive alloy active elements are further constrained in that they typically must be configured as a monolithic element with a heavy solenoidal control coil positioned around the element. Piezoelectric and electrostrictive elements provided in the form of stacks of ceramic wafers are conversely relatively light, and thus for many applications are the preferred active element.

In a conventional piezoelectric or electrostrictive wafer stack, each ceramic wafer is separated by a bond layer that extends across the wafer surface and to which electrical connection is made to produce an electric field across the thickness of each wafer to enable actuation along the longitudinal axis of the stack. Each such bond layer electrode in the stack adds compliance to the stack and thus reduces the overall mechanical stiffness of the stack. An alternative known piezoelectric stack configuration is based on a co-firing process in which electrodes and ceramic material are interleaved, with each electrode extending only partially across the stack diameter. This configuration significantly reduces the compliance losses characteristic of conventional stack bond layers. However, because the electrodes of the co-fired configuration normally do not extend completely across the stack diameter, a large electric field singularity can be produced at a point along the stack radius, in turn reducing the fatigue life of the stack.

The selection of a given piezoelectric or electrostrictive stack topology is thus generally based on a trade off between increased stack compliance and shortened stack fatigue life. For critical actuator applications, e.g., aerospace applications, it is generally preferred that a conventional bond layer piezoelectric stack configuration be employed, because the shortened fatigue life associated with co-fired stacks is deemed for these applications to be a greater risk than are performance losses due to compliance of bond layer stacks. Advantageously, it has been found that even accounting for the bond layer compliance losses, conventional piezoelectric and electrostrictive wafer stacks are characterized by a higher energy density than other active materials.

Given the use of a piezoelectric or electrostrictive wafer stack as preferred with the actuation configuration of the invention, it is then preferred that relatively thick wafers be employed to minimize bond layer compliance losses. As can be recognized, the maximum wafer thickness is limited by the desired maximum voltage to be developed across a given wafer in the stack. The selected piezoelectric or electrostrictive material preferably has a high energy density, e.g., an energy density level like that associated with the ceramic lead-zirconate-titonate (PZT). With this specification, it is found that a piezoelectric or electrostrictive stack is particularly well-suited for the actuator of the invention in that such a stack provides the high bandwidth and low weight required of many applications, and the large stroke amplification enabled by the actuator frame compensates for the relatively small expansion stroke characteristic of such a stack.

Table I below provides the strain, $\epsilon$, modulus, E, material density, $\rho$, energy density, equal to $0.5(E\epsilon^2/\rho)$, and characteristic bandwidth for various active element material candidates for the actuator of the invention, including bulk magnetostrictive alloy (MS), a longitudinal bulk shape memory ceramic (SMC), a longitudinal electrostrictive material (ES), a longitudinal bulk piezoelectric material of lead-magnesium-niobate (EC-98) that is preferred, and a EC-98 stack of 144 wafers that is preferred.

TABLE I

| Material | Maximum Strain $\epsilon$(microstrain) | Young's Modulus $E(10^6$ psi) | Material Density $\rho$(slug/ft$^3$) | Energy Density (ft-lb/slug) | Bandwidth (Hz) |
|---|---|---|---|---|---|
| MS | 1500 | 4.3 | 17.9 | 39 | <10,000 |
| SMC | 3000 | 9.5 | 14.6 | 422 | <100 |
| ES | 750 | 6.9 | 15.1 | 19 | 10,000 |
| EC-98 | 1650 | 6.9 | 15.2 | 89 | 100,000 |
| EC-98 stack | 1650 | 4.8 | 15.2 | 62 | 100,000 |

Turning to the actuator frames, the material employed for the frames of the actuator is preferably selected based on mass efficiency, weight, size, thermal, and cost considerations for a given application of the actuator. Considering first efficiency, the mass efficiency, $\eta_{mass}$, of an actuator is given as:

$$\eta_{mass} = \frac{\frac{1}{2}k_{out}w_{free}^2}{M_{tot}} \frac{M_a}{\frac{1}{2}E_a\epsilon_{free}^2 V_a}; \quad (9)$$

where $k_{out}$ is the stiffness of the actuator stroke mechanism output; $w_{free}$ is the free, i.e., unloaded, displacement of the actuator output stroke mechanism; and $E_a$, $\epsilon_{free}$, and $V_a$ are, respectively, the effective Young's modulus, free induced strain, and volume of the active stack element taking into account active element stack bond layer losses.

Considering a theoretical representation of the actuator stroke amplification mechanism in which the longitudinal stack axis coincides with the actuator output stroke axis, and wherein a stroke amplification factor, A, is given to be 100% efficient, the stacks' endcaps are given to be infinitely stiff, and the stack and frame are given to be of the same length, L, then the actuator output stiffness, $k_{out}$, is given as:

$$k_{out} = \frac{1}{A^2} \frac{k_a k_f}{k_a + k_f}; \quad (10)$$

where $k_a$ and $k_f$ are the stiffness characteristic of the active element stack and the frame, respectively. In this theoretical representation, the free deflection of the actuator, $w_{free}$, is given as:

$$w_{free} = \epsilon_{free} LA. \quad (11)$$

Given that the total mass of the actuator, $M_{tot}$, is equal to the sum of the mass of the frame, $M_{frame}$, and the mass of the active stack element, $M_{active}$, where the active element mass, $M_a = A_a L \rho_a$, with $A_a$ being the cross-sectional area of the stack and $\rho_a$ being the material density of the stack; and the frame mass, $M_{frame} = A_{frame} L \rho_{frame}$, with $A_{frame}$ being the frame cross-sectional area and $\rho_{frame}$ being the frame material density, then the mass efficiency given in relation (9) above can be restated as:

$$\eta_{mass} = \frac{1}{(1 + \overline{EA})\left(1 + \frac{1}{\overline{\rho A}}\right)}; \quad (12)$$

where the overlines represent parameter ratios of active stack element to frame, for example, with $\overline{E} = E_a/E_f$ being the ratio of active stack element modulus, $E_a$ to frame modulus, $E_f$. Optimizing this mass efficiency relationship with respect to the ratio of active element area to frame area indicates the optimum area ratio, $\overline{A}^*$, of active element to frame material, as:

$$\overline{A}^* = \frac{1}{\sqrt{\overline{E\rho}}}. \quad (13)$$

With this optimization, it can be stated that the optimum mass efficiency, $\eta_{mass}^*$ attainable for an active stack element reacting against an inert frame is given as:

$$\eta_{mass}^* = \frac{1}{\left(1 + \sqrt{\alpha}\right)^2}; \quad (14)$$

where $\alpha$ is given as the ratio of specific modulus of the active stack element to specific modulus of the frame, as:

$$\alpha = \frac{E_a/\rho_a}{E_f/\rho_f} = \frac{\overline{E}}{\overline{\rho}}. \quad (15)$$

The optimized mass efficiency represents an upper bound on the achievable mass efficiency for the stack-based actuator of the invention as a function of selected stack and frame materials. It is seen that the maximum achievable mass efficiency of the actuator increases as the specific modulus of the frame is increased relative to the specific modulus of the active stack element.

Figure 3:
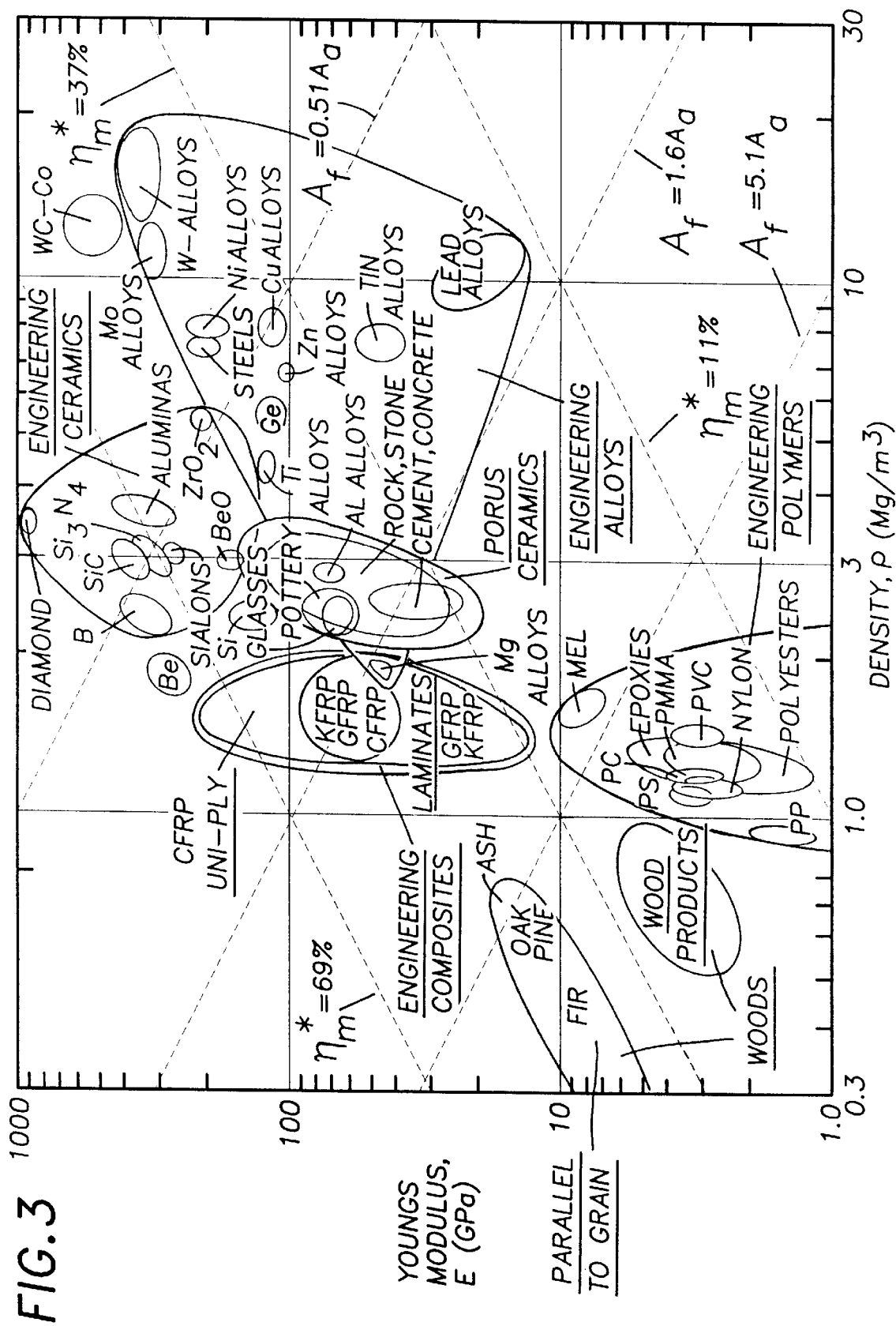
FIG. 3 is a graph of various candidate materials for the frame of the actuator of the invention, plotted as a function of material modulus and material density and indicating lines of constant mass efficiency and frame cross-sectional area for various modulus-density combinations.

The optimum actuator frame material for a desired actuator active stack element can thus be selected based on mass efficiency criteria using this relation. Referring to FIG. 3, there is shown a graph identifying various candidate frame materials plotted based on modulus, E, and material density, ρ, of the materials. In the plot, lines of constant optimum mass efficiency, $\eta_m^*$, for various modulus and density combinations, are shown for efficiencies of 11%, 37%, and 69%, assuming the modulus and material density properties of the active piezoelectric stack configuration for EC-98 given above in Table I.

Based on the plotted efficiencies, it is seen that exotic frame materials such as diamond, boron, and silicon carbide can enable very high mass efficiency actuator configurations, as can various engineering composites such as graphite/epoxy. These materials are particularly superior in that they enable an actuator configuration of relatively light weight. However, these relatively low density materials may not be preferred for applications requiring a high degree of actuator stiffness. For a given desired stiffness, a larger cross-sectional frame area is required of a low-density material than of a relatively higher-density material, to obtain a corresponding stiffening weight. In actuator applications such as aerospace applications that are generally characterized as having a constrained area, frame cross-sectional area required for a desired stiffness or weight is thus preferably considered in tandem with mass efficiency requirements of the application.

In the plot of FIG. 3, lines of constant frame area, $A_f$, as a function of active element area, $A_a$, for various modulus and density combinations, are shown for frame areas equal to $0.51A_a$, $1.6A_a$, and $5.1A_a$. These lines of constant frame area are based on relation (13) above, which provides the optimum area ratio of active stack element to frame material necessary for achieving the optimal actuator mass efficiency as defined in relation (14) above. The piezoelectric stack modulus and material density assumed in these three lines is that of the piezoelectric stack configuration for EC-98 as given above in Table I. Using the constant area lines in conjunction with the constant efficiency lines shown in the plot, the tradeoff between actuator size and actuator efficiency in selection of a frame material for a given active stack element material can be ascertained from the plot. Based on these dual considerations, it is seen that a relatively high-density material such as tungsten carbide enables a high efficiency actuator having a relatively small area, and tungsten carbide thus can be a preferable frame material for some actuator applications. But given size, volume, mass, and efficiency specifications for a selected application, it can be recognized that tradeoffs in such specifications are typically required, and accordingly, that selection of a material preferably considers all specifications.

Indeed, it is to be recognized that for many applications, other factors, such as thermal compatibility, fatigue life, strength, cost, and ease of manufacture can be of equal importance with efficiency, size, and weight, in selection of a frame material. For some applications, for example, the high cost, low strength, and manufacturing complexity associated with an exotic material like diamond, can render this material less preferable than other less theoretically optimum materials, such as steel, which is characterized by low cost, ease of machining, and relatively high density. As can be recognized, the plot of FIG. 3 can be extended in three dimensions and in, e.g., an arrayed fashion, for including more than two selection criteria to aid in frame material selection analysis.

For many applications, it is preferred that the coefficient of thermal expansion (CTE) of the frame material be relatively similar to that of the active stack element material. Disparate frame and active element CTEs can produce a relative thermal actuator strain that diminishes the overall actuator performance. One example frame configuration that is particularly well-suited for minimizing frame-active element CTE mismatch employs a frame composite composed of, e.g., a matrix material and fiber materials, a matrix and particle material composite, a planar bi-material composite, or other composite including materials that are characterized by CTEs which bound the CTE of the active stack element material. Optimally, such a frame composite material is characterized by a high specific modulus, for enabling high actuator mass efficiency, as well as a CTE that specifically is characterized in the longitudinal direction as being approximately equal to that of the active stack element material. Given material CTE values, the plot of FIG. 3 can be employed to analyze the suitability of various candidate frame composites.

Given the preferred piezoelectric stack configuration for the EC-98 material in Table I above, having a CTE of about $4\,\mu\epsilon/°$ C., one preferable composite frame material is a metal matrix composite formed of a titanium matrix and silicon carbide fibers, particles, or other form. The specific proportions of the matrix and other, e.g., fiber materials to be employed for obtaining the desired frame CTE can be ascertained using the conventional rule of mixtures, which predicts the properties of a composite based on the proportions of the materials constituent in the composite. The CTE of the metal matrix composite, $CTE_{MMC}$, is given based on the rule of mixtures as:

$$CTE_{MMC} = \frac{E_f V_f CTE_f + E_m(1-V_f)CTE_m}{E_f V_f + E_m(1-V_f)}; \quad (16)$$

where $E_f$ and $E_m$ are the modulii of the fiber and matrix, respectively; $CTE_f$ and $CTE_m$ are the coefficients of thermal expansion of the fiber and matrix materials, ; and $V_f$ is the volume fraction of fiber material to matrix material.

Given a titanium matrix modulus and density of about 110 GPa 4.1 Mg/m³, respectively, given a silicon carbide fiber modulus and density of about 400 GPa and 3 Mg/m³, respectively, and using the piezoelectric active stack material modulus and density of the EC-98 stack material given in Table I above, in relation (16) above, it is found that a composite frame having a silicon carbide fiber volume fraction of about 0.82 and a corresponding titanium matrix volume fraction of about 0.18 is characterized by a CTE that matches the active stack element material EC-98 CTE.

The rule of mixtures can further be applied to the composite in the manner of relation (16) above to ascertain the composite modulus and material density. Table II below provides the density, modulus, and CTE characteristics of the silicon carbide fiber-titanium matrix constituents and composite.

TABLE II

|  | Silicon Carbide Fiber | Titanium Matrix | Frame Composite |
| --- | --- | --- | --- |
| Density: | 3 Mg/m$^3$ | 4.1 Mg/m$^3$ | 3.2 Mg/m$^3$ |
| Modulus: | 400 GPa | 110 GPa | 348 GPa |
| CTE: | 3.7 microstrain/°C. | 9 microstrain/°C. | 4 microstrain/°C. |

Based on the modulus and density of the stack element material EC-98 given in Table I above, it is found that the silicon carbide-titanium frame composite yields an optimum mass efficiency of about 65.5%, based on relation (14) above, with an optimum ratio of frame to stack cross-sectional area of $A_f=0.858A_a$. As can be recognized, these superior performance advantages must be balanced against the high cost and complexity of manufacture of this frame composite in determining its suitability for a given application.

Aside from the passive frame composite just described, the actuator frame can be formed of an active fiber composite, consisting of fibers of an active material, e.g., fibers of a piezoelectric ceramic, set in a matrix of, e.g., epoxy. Such an active composite advantageously is typically characterized by a relatively high specific modulus, and inherently has the ability to provide a frame that can itself be actuated and operated under tensile conditions without breaking. As can be recognized, yet other active as well as passive frame materials can be employed to meet specific requirements of a given actuator application. For a selected frame material that is a metal, it is preferred that in fabrication, the inner and outer frames each be machined out of a solid metal piece using, e.g., a hand milling machine. The sharp inside corners that are preferably provided at the end plate can be produced using, e.g., a broaching process, as is conventional. As can be recognized, any of a wide range of other machining processes can be employed to produce the actuator frames. For example, electron discharge machining or other machining process can be employed. Fabrication of composite frame structures can be accomplished as is conventional by curing composite material mixtures in, e.g., a machined mold. Post-mold machining can be employed, as is conventional, to produce critical or intricate details as is desired.

Figure 4:
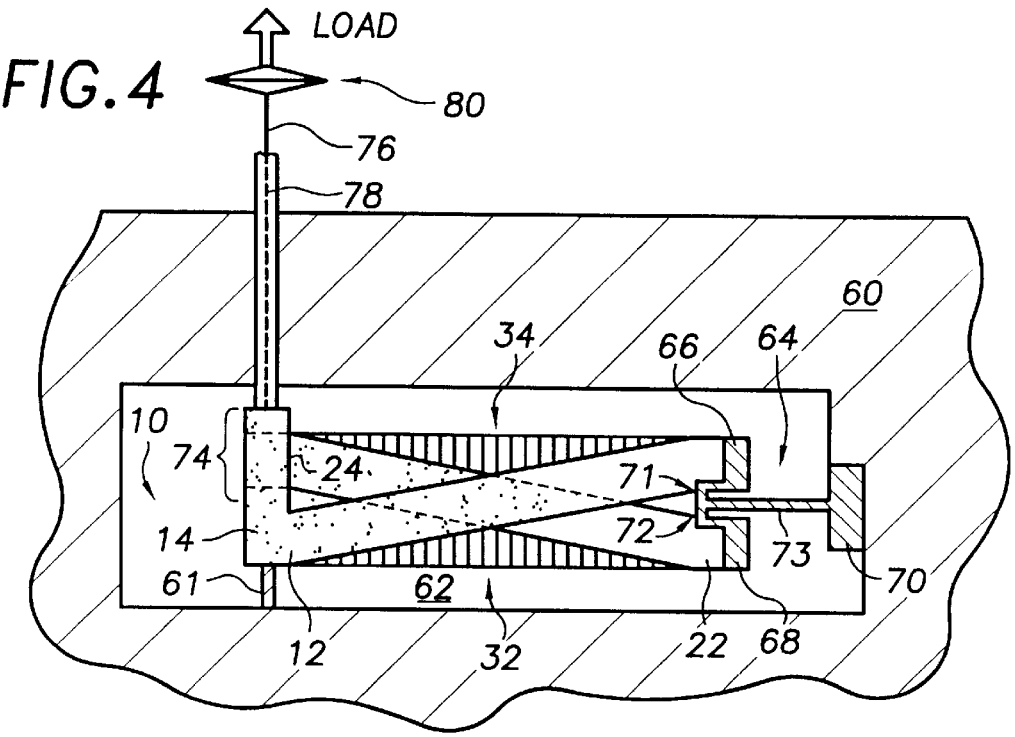
FIG. 4 is a side view of an example packaging configuration for the actuator of the invention.

Referring to FIG. 4, given a selected size, material composition, and mode of manufacture for the actuator of the invention, the actuator 10 can be housed in an engineering structure 60 for packaging and interface with an application. In one example housing scenario, the mounting end plate 14 of the outer frame 12 is fixed to the housing structure 60 by, e.g., a mounting support flexure 61 that maintains the outer frame a distance from the housing inner wall. At the pivot ends of the outer and inner frames there can be provided a support flexure 64 that enables the frame pivot action of a rolling pin, as shown in FIG. 1, but that also provides support of the actuator frames within the housing, as well as equilibrating the actuator load between the frames. As shown in FIG. 4, such a support flexure 64 can include outer and inner frame support plates 66, 68, respectively, and a housing support plate 70, connected to the frame support plates through corresponding flexural links 71, 72, by a flexure strut 73. Preferably, the support flexure is formed of a material such as high tensile strength steel. As can be recognized, other support flexure materials and configurations can be employed, including hinge configurations or other suitable geometry. Whatever configuration, the support flexure preferably provides sufficient structural support to maintain the actuator in a stable position in the housing chamber 62 and is thermally compatible with the frame material.

For many applications, it can be preferred that the mounting end plate 14 of the outer frame 12 be elongated to define a stroke extension track 74 in which the inner frame displacement endplate 24 reciprocates during actuation. The extension track 74 enables restraint of out-of-plane motion of the inner frame as it reciprocates, thereby reducing losses in transfer of force to the actuator output stroke and contact of the inner frame with the engineering structure 60.

An actuator stroke delivery mechanism such as a stroke control rod 76 is attached to the displacement end plate of the inner frame and configured through a reaction tube 78 in the actuator housing 60 to connect to an external load. A compressive pre-load spring 80, e.g., one or more Belleville springs, can be connected between the stroke control rod and a stationary reference frame (not shown) for producing a compressive pre-load condition in the active stack elements; as previously explained, this is preferred for maintaining the stacks in a state of compression throughout operation. As can be recognized, such a pre-load spring can be positioned elsewhere in the actuator configuration, e.g., between the upper edge of the outer frame stroke extension track 74 and the displacement end plate 24 of the inner frame. Placement of a pre-load spring relatively close to the stroke load, and preferably in the load path, enables the spring to reduce actuator backlash caused by clearance tolerances in the load mechanism.

The compressive pre-load spring specifically provides the ability to maintain all contact surfaces of the actuator in compression as the active elements both extend and contract, enabling rolling instead of flexural contacts and thereby minimizing compliance along the active element longitudinal axis of expansion and contraction. In addition, maintenance of the active stack elements in a state of compression enhances the fatigue life of the stacks. As is well-recognized, the fatigue life of active stack elements is diminished if the stacks operate under tensile conditions. Maintenance of the stack elements in compression thereby extends the stack element fatigue life and reduces susceptibility to fatigue-associated failure mechanisms.

With this packaging and application interconnection, it is found that the actuator of the invention provides many of the characteristics required to achieve optimal efficiency for a given set of actuator materials. No flexures are required to enable reaction of stacks against the frames; the rolling contacts of the actuator stack elements, held in compression throughout the stroke cycle, do not incorporate compliance along the stroke load-bearing path, although they do slightly reduce the actuator efficiency due to Hertzian losses characteristic of such rolling contacts. It is found, however, that these slight losses are overshadowed by the very large reduction in compliance achieved with the contacts. Additionally, because the rolling contacts do not require use of attachment fasteners, they can eliminate eccentric loading of the stack elements and losses associate with such loading.

The pivot mechanism between the pivot ends of the inner and outer frames is located at the cross member of the strut between the frames in the truss geometry of the actuator, as shown in FIGS. 2A–2C, which is a low-force leg of the actuator load-bearing stroke path relative to the stack elements. As a result, the compliance of the pivot mechanism does not substantially increase overall compliance of the stroke mechanism, and accordingly, does not reduce the mass efficiency of the actuator. Furthermore, the inherently stiff nature of the inner and outer frame geometries, in combination with the direct stroke extension mechanism of the inner frame, results in a stroke amplification and extension mechanism that inherently exhibits little bending.

The form factor of the actuator of the invention is also particularly superior. The actuator design is inherently compact and as shown in FIG. 4, can be easily accommodated in a rectangular cavity. The actuator does not require complicated manufacturing or construction operations, and can be produced from any of a wide range of frame materials selected to suit a particular application.

The actuator of the invention is not limited to the precise geometry illustrated in FIGS. 1 and 4. Indeed, the invention contemplates a wide range of actuator configurations and components that operate to produce a high efficiency, high linearity, large stroke, and high bandwidth stroke mechanism. For example, the two active elements of the actuator can be of differing active materials and furthermore, can be any of a wide range of expansive materials, that like those described above, can be stimulated by an external stimulus, e.g., electric, magnetic, or thermal stimulus, to expand and contract. One of the active elements can be replaced with an inactive, i.e., inert material longitudinal span member. In this scenario, at least one of either of the first or second spans is an active element while the other is an inert element such as a steel strut. A combination of more than one strut, span, and active element can be employed as called for in a given application. The inner and outer frame geometries of the actuator can also be modified with respect to each other as well as with respect to the two active elements. Preferably, whatever configuration is employed, the active elements and the contacts between the active elements and frames are maintained in compression during operation.

The inner and outer frames require the ability to pivot with respect to each other but do not require that a specific one of the frames be mounted at a specific location. Accordingly, the outer frame does not necessarily need to provide the actuator mounting point; another suitable point of the actuator can instead be mounted. Indeed, in contrast with the example configuration shown in FIGS. 1 and 4 the inner frame can be mounted with the outer frame providing the actuator output stroke extension. Alternatively, a mounting at the frames' pivot locations and be employed to accommodate free movement of the opposite ends of both frames. As can be recognized based on this discussion, a wide range of mounting, configuration, and component adaptations are contemplated by the invention.

Figure 7A:
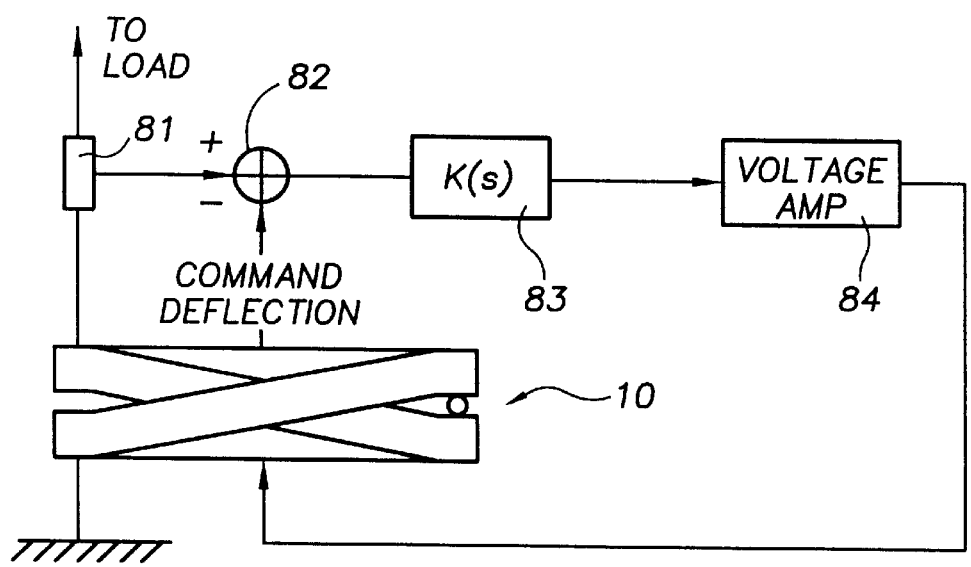
FIGS. 7A–7C are three example load control systems employing the actuator of the invention for controlling load displacement, commanded force, and commanded stiffness, respectively.

Whatever configuration is employed, the actuator of the invention is well-suited to load control in a feedback control system. In a first example of such a load control system, shown in FIG. 7A, the actuator 10 is configured in a feedback loop for controlling displacement of a load. A displacement sensing device 81, e.g., a potentiometer, an interferometer, or other displacement sensing device, is connected at the output of the actuator to sense movement of the load. An indication of load displacement is then summed 82 with the negative of an indication of the displacement that was commanded by the actuator 10, and the difference is delivered to a controller 83 for correspondingly controlling a voltage amplifier 84 to deliver a controlled voltage to the actuator. The controlled voltage accordingly adjusts the stroke extension of the actuator in response to the sensed load displacement to controllably compensate for changes in the load displacement and therefore to maintain a desired load displacement.

Figure 7B:
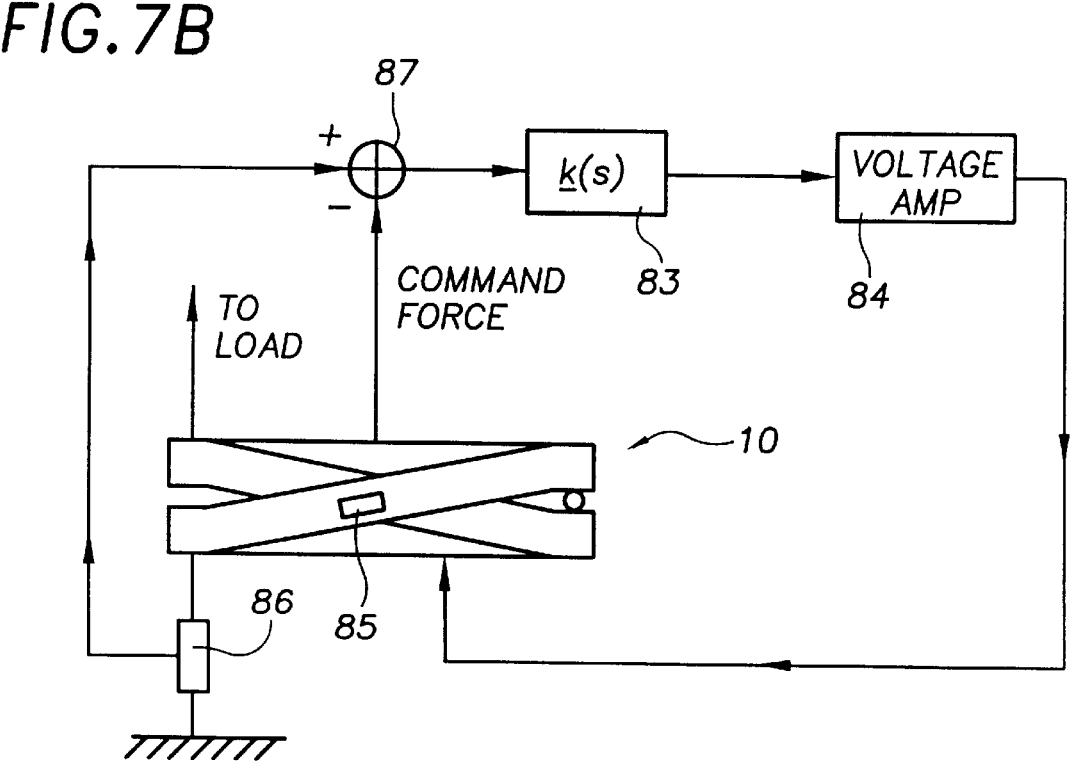

In a second example of a load control system, here a system for controlling the force to be commanded to a load, as shown in FIG. 7B, the actuator 10 is configured with a strain gauge 85 and/or a load cell 86 is connected to the mounting end plate of the outer frame, for sensing the force produced by the actuator along the actuator output stroke path. An indication of the produced force is summed 87 with the negative of an indication of the commanded force and the result is employed by a controller 83 to control voltage supplied by a voltage amplifier 84 for correspondingly controlling the force output of the actuator.

Figure 7C:
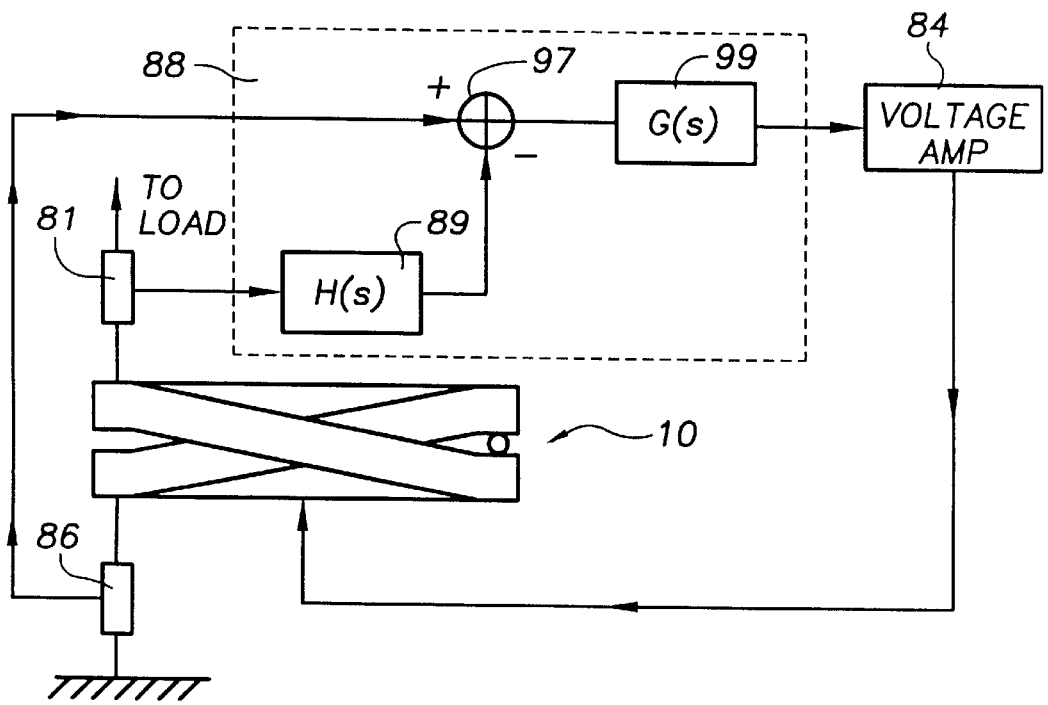

In a further example of a load control system, as shown in FIG. 7C, force and load displacement are together controlled. This control system is particularly advantageous for applications where the actuator is employed to effect a desired stiffness. As shown in the figure, the system here includes a load displacement sensor 81 as well as a load cell 86 or alternatively, a strain gauge. The controller 88 here includes a first network 89 to which an indication of load displacement is directed for comparison with a prescribed desired stiffness as a function of frequency. An indication of force from the load cell 86 is summed 97 with the negative of the filtered displacement indication. A compensator 99 of the controller 88 correspondingly controls a voltage amplifier 84 to command the actuator with a voltage that approximately produces the prescribed stiffness. As a result, the stiffness of the actuator can be tailored to the particular characteristics of a given load. As can be recognized, these load control systems are examples of the range of load control contemplated by the invention. Other such load and actuator control can be configured with specific characteristics called for by a given application of the actuator.

An actuator in accordance with the invention was produced including steel inner and outer frames and a steel rolling pin. The inner and outer frames were machined to the dimensions given below in Table III.

TABLE III

|  | Outer Frame | Inner Frame |
| --- | --- | --- |
| Side member length: | 3.27" | 3.27" |
| End plate width: | 0.69" | 0.52" |
| End plate height: | 0.32" | 0.32" |
| End plate depth: | 0.19" | 0.19" |

The nominal frame/stack angle, $\theta_{nom}$, shown in FIGS. 2A–2C, and selected based on a desired stroke amplification, was set at about 7.84°, for a nominal stroke amplification of about 14.5. The corresponding geometric truss cross member height, $h_{nom}$, to enable this was accommodated with a steel pin having a diameter of about 0.134". With this configuration, each of the two stack lengths was set at about 3.274".

The two stack elements were prepared by EDO Corporation, of Salt Lake City, Utah; each wafer was 0.315"-diameter, 0.020"-thick, with a 0.0015"-thick bond/electrode layer between each wafer, with 144 circular wafers, of the electrostrictive ceramic EC-98 specified in Table I, each wafer separated by a bond and electrode layer. A stainless steel cylindrical endcap of radius of about 0.1575" was provided at the pivot end of each of the stacks, and a stainless steel end plate of about 0.020" in thickness was provided at the mounting or displacement end of the corresponding stack. The stacks were encased in a shrink sleeve, as is conventional, with electrical connections via the sleeve to the bond electrode layers.

Table IV below lays forth the modulii and material density of the frame and stack materials.

TABLE IV

|  | Steel Frame | EC-98 Stack material |
| --- | --- | --- |
| Young's Modulus, E | $29 \times 10^6$ psi | $4.8 \times 10^6$ psi |
| Material Density, $\rho$ | 7860 kg/m$^3$ | 7850 kg/m$^3$ |

The frame and stack designs resulted in a frame area, $A_f$, equal to about 0.48 times $A_a$, the active stack element area, and an overall actuator weight of about 125 grams, with each stack assembly, including end caps, weighing about 36 grams. A compressive pre-load spring was provided by hanging a 25 lb weight at the moveable end of the actuator to maintain the actuator in a state of compression throughout all phases of the stroke cycle.

In operation, application of a negative potential, and corresponding negative electric field, across each of the EC-98 stacks causes the stacks to contract and to result in extension of the actuator stroke; while application of a positive potential, and corresponding positive electric field, across each of the stacks, causes the stacks to expand and to result in retraction of the actuator stroke. For the EC-98 stacks, it is found that a large negative field can heat and depolarize the material, and accordingly, a DC bias of about +400 V was maintained across each of the stacks. With this DC bias, an operational electric field swing of about −10 V/mil to about +50 V/mil was specified to produce the achievable strain of ±825 microstrain characteristic of the material. Given that the stack wafers were about 20 mils-thick, the corresponding operational applied voltage swing was about −200 V to about +1000 V. This was supplied operationally as a ±600 V sinusoid superimposed on the +400 V DC bias.

The theoretical optimal mass efficiency for the experimental actuator is predicted by the relation (14) described above to be about 50%. Experimentally, the actual mass efficiency of the actuator was found to be as high as about 25%. The actual efficiency of the experimental actuator was found to be less than the predicted optimal mass efficiency for a variety of reasons. It was experimentally found that some spanning losses occur at each of the frame end plates due to frame and plate bending. These spanning losses are an unavoidable consequence of the "X" frame configuration in which the frames straddle the stacks. Strain gauge measurements indicated that this end plate bending reduces the actuator efficiency up to about 12%. It is here reiterated that even with these losses, the actuator of the invention is found to be significantly more efficient than comparable conventional actuator designs, and the operational and structural advantages it provides render it overall a superior actuator for many applications.

It was additionally found that the cylindrical and flat endcaps of the two stacks somewhat eccentrically loaded the stacks, thereby added bending stresses to the stacks and increasing the overall compliance of the actuator system. In addition, a measurable level of flertzian losses occurred at the interface between the stacks and the frame end plates. Experimentally, such losses were found to decrease actuator performance by about 7%. Although this is a finite degree of loss, it is significantly less than the loss associated with flexures as used in conventional actuator designs.

Figure 5A:
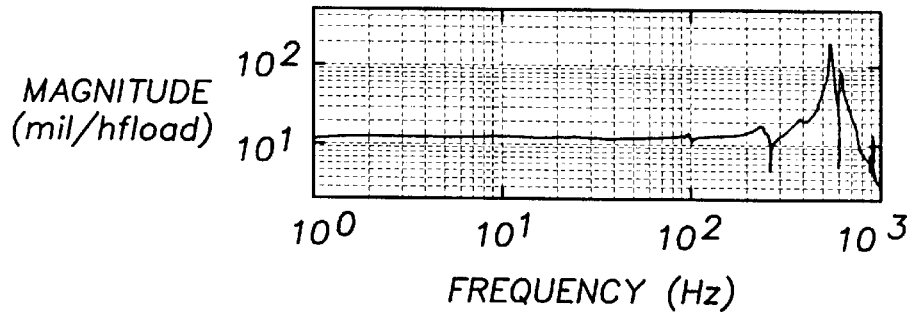
FIG. 5A is a plot of the magnitude of the frequency-dependent transfer function characteristic of an experimental actuator produced in accordance with the invention.
Figure 5B:
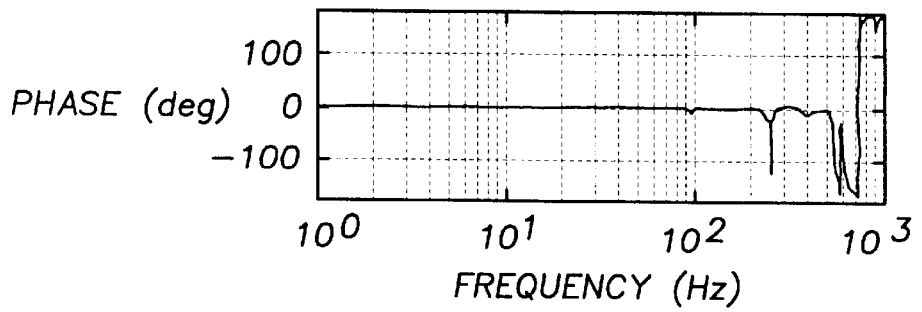
FIG. 5B is a plot of the phase of the frequency-dependent transfer function characteristic of an experimental actuator produced in accordance with the invention.

FIG. 5A is a plot of the magnitude of the frequency response of the experimental actuator, with the phase of the frequency response plotted in FIG. 5B. Experimentally, a load spring having a stiffness of about 777 lb/inch was provided for this measurement. The load spring stiffness was selected to approximately match the theoretically-predicted actuator output stiffness to enable output impedance matching and to maximize transfer of energy to the spring load. This frequency response indicates a first actuator mode at about 530 Hz. As can be recognized, higher loading than that employed in the experiment will result in an increase of the bandwidth, while a reduction in loading will result in a decrease in bandwidth.

Figure 6:
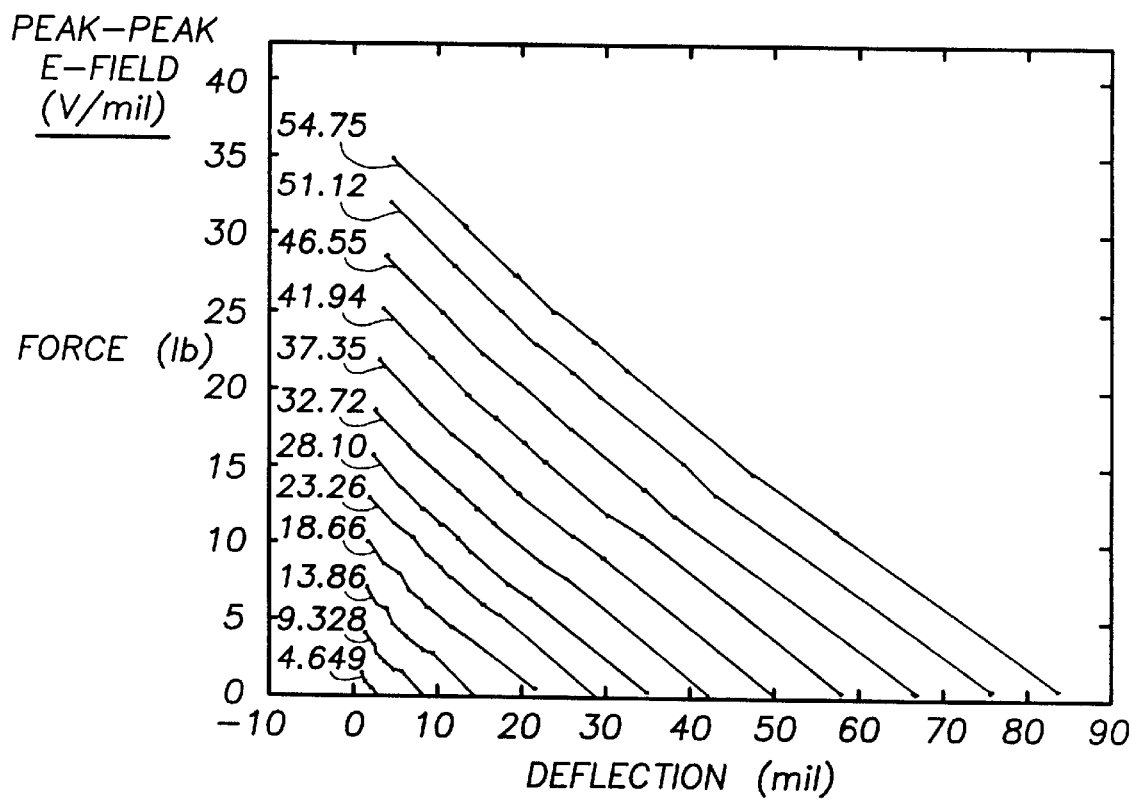
FIG. 6 is a plot of output force-deflection lines of an experimental actuator produced in accordance with the invention for twelve different electric field strengths identified in the legend of the plot.

FIG. 6 is a plot of force/deflection load lines for the experimental actuator for twelve different peak-to-peak electric field stack levels. Each line in the plot corresponds to one of the electric field levels as given in the plot legend. Note that each of the load lines is substantially linear across the line except for that section of each of the lines that approaches the low-force, i.e., free, boundary condition. The nonlinearity exhibited at this free boundary condition is a function of the inherent nonlinear free strain-to-electric field behavior of the stacks, rather than the actuator design, as explained earlier. The nonlinearity exhibited at the blocked, i.e., zero-deflection condition section of each of the lines is most likely due to hardening of the stack inter-wafer bond layers at this highly compressive condition. The relatively even spacing between the twelve lines indicates that the strain-to-electric field functionality of the stacks is linear for a given boundary condition.

Turning to applications of the actuator provided by the invention, a first particularly relevant application is that of active helicopter rotor blade servo-flap control. The Kaman K-max helicopter is an example helicopter that includes servo-flaps which can be actively rotationally controlled to reduce interaction of each rotor blade with the wake vortex of preceding blades in order to reduce vibration and noise produced by the interaction. There is increasing interest in use of active, i.e., electrically-stimulated, servo-flap control rather than conventional swashplate control, due to advantages such as reduced number of moving parts, compact size, ease of control, elimination of hydraulic and pneumatic power, and modularity provided by active actuator configurations. In addition, blade-mounted actuators, can induce twist along the blade to tailor the lift of the blade in a more effective manner than can a more traditional control approach.

Figure 8A:
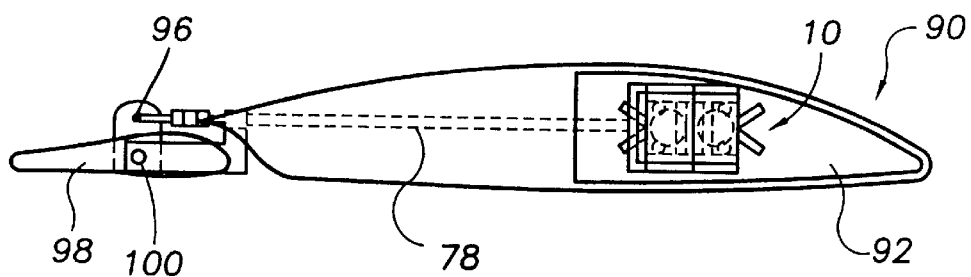
FIGS. 8A–8B are side and top views, respectively, of an actuator in accordance with the invention configured in a helicopter rotor blade for active rotational control of a trailing blade flap.
Figure 8B:
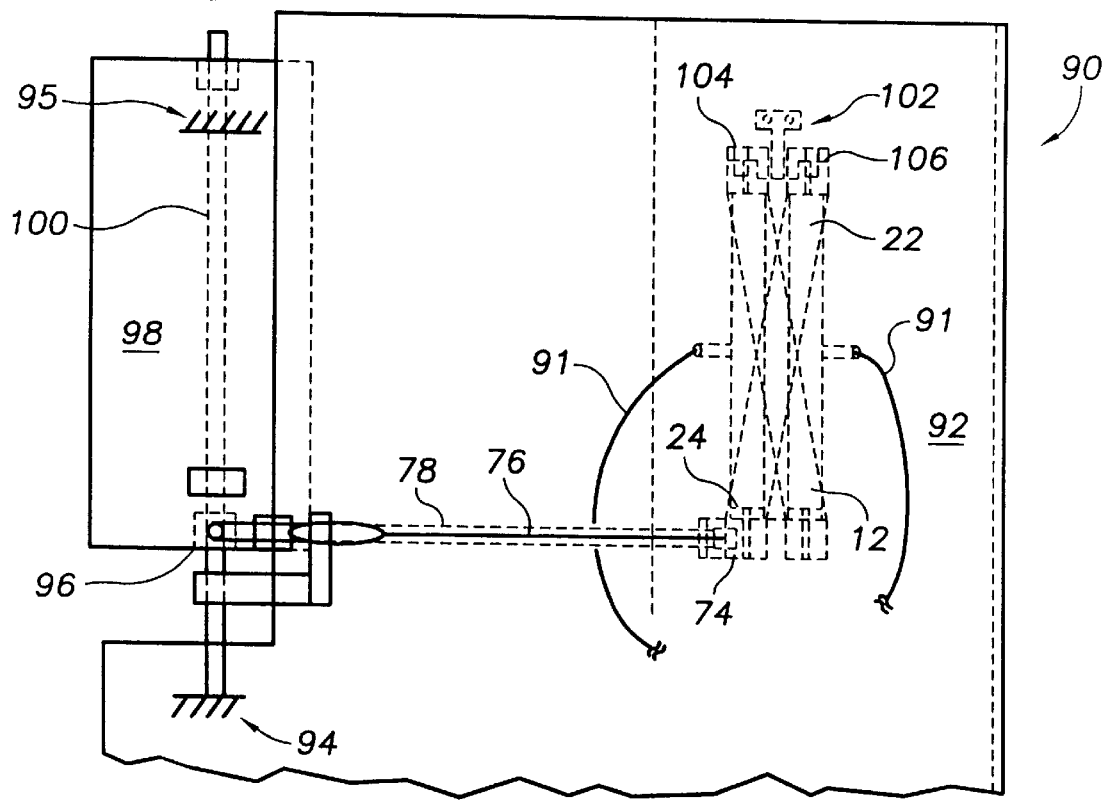
Figure 9:
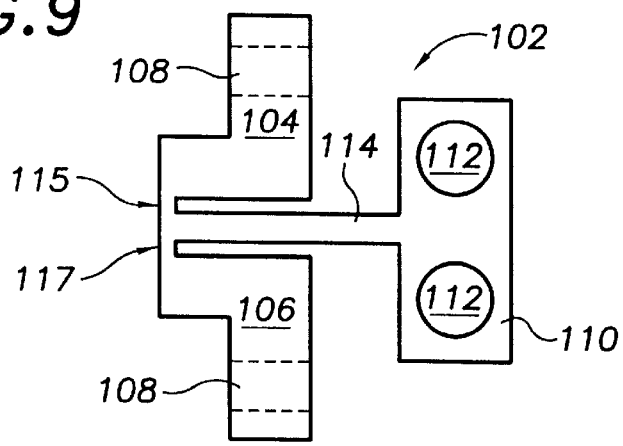
FIG. 9 is a front view of a centrifugal flexural support for use in the actuator mounting configuration in the helicopter rotor blade shown in FIGS. 8A–8B.

The actuator of the invention is particularly well-suited to helicopter rotor blade servo-flap control. FIGS. 8A and 8B illustrate cross-sectional and top-down views of a rotor blade incorporating the actuator 10. In this application, it is preferable that centrifugal and out-of-plane degrees of freedom of the actuator output and pivot end, as well as in-plane motion of the actuator pivot end, be operationally restrained. It is also preferable that the blade weight be minimized by locating electrical driving circuitry off-blade, in a non-rotating frame, with electrical control delivered to the actuator and blade rotating frame by, e.g., high-voltage slip ring connections 91, as shown in the figure and as is conventional. Accordingly, electrical driving circuitry such as switching amplifiers are preferably housed remotely from the blade.

As shown in the figure, the actuator 10 is located in proximity to the blade spar 92 with the actuator stroke output connected to a control rod 76 housed in a reaction tube 78, with the two extending through the blade to a rotational pivot 96 connected to the blade trailing flap 98. A pre-load mechanism, e.g., a length of superelastic nitenol wire 100, loaded in torsion and attached between a mount 94 on the airfoil and a corresponding mount 95 on the trailing edge flap is provided to achieve a desired pre-load state of active element compression in the manner described earlier. This pre-load also operates as a thrust bearing to retain the trailing edge flap against the centrifugal force.

As is seen in the figures, the actuator of the invention can be positioned in the blade spar 92 such that the actuator stacks align with the rotor blade span, whereby the stacks' longitudinal axes coincide with the axis of centrifugal forces of the blade. This configuration ensures that any stack deflection is primarily centrifugal, i.e., longitudinal, rather than in-plane, i.e., transverse, to thereby minimize bending stresses in the stacks, and with appropriate support, can be employed to inherently produce a component of pre-load compressive stress on the stacks.

The actuator 10 is for this application provided with a centrifugal flexural support 102 that like the flexural support of the actuator in FIG. 4, provides the functionality of a roller pin for frame pivoting, and additionally enables mounting of the pivot end of the actuator to the blade. A more detailed view of the centrifugal flexural support 102 is shown in FIG. 8. The support 102 includes inner and outer frame support plates 104, 106, respectively, provided with, e.g., mounting holes 108 for mounting to the frames' end plates with, e.g., screws. A blade support 110 likewise is provided and includes, e.g., holes 112 for mounting to the blade with, e.g., screws. A flexural strut 114 connects the end plate and blade support plates through corresponding flexural links 115, 117.

With this configuration, the centrifugal flexural support reacts the centripetal force of the actuator to the blade spar, and specifically reacts the centripetal acceleration of both sides of the actuator at equidistant points, thereby loading each of the stacks to an equal degree. The flexural support also restrains the actuator from out-of-plane motion and from rotation about the pitch axis of the blade. As can be recognized, various other centrifugal flexural support configurations can be employed to provide such restraint.

The outer frame 12 of the actuator 10 here includes a stroke extension track 74, like that shown in FIG. 4, along which the displacement end plate 24 of the inner frame 22 slides during stroke extension and retraction. In this application, the inside of the track is preferably coated with a low friction coating such as the coating known as Karon, available from Kamatics, Inc.

Beyond this rotor blade flap control application, the actuator of the invention is particularly well-suited to a wide range of applications. While conventional actuators commonly exhibit one of high mass efficiency, high bandwidth, linearity, or large stroke performance advantages, the actuator of the invention provides all four of these advantages, in addition to providing a compact actuator size, uncomplicated geometry, and ease of manufacture, and importantly, a wide scaling range. As a result, the actuator of the invention can be adapted to many applications and can accommodate a range of mechanical and operational engineering system constraints.

High mass efficiency is an actuator performance goal that is desirable for most actuator applications. But aside from this generally universal criterion, low actuator weight, which is a contributor to actuator mass efficiency, is critical for a variety of engineering systems ranging from aerospace applications to automotive and printing applications. As is well-recognized, an enormous power premium is placed on air-borne systems; heavier payloads in air as well as space vehicles limit the achievable range of flight and increase cost of operation. Use of the actuator of the invention for displacement of rocket nozzles for attitude control, for control of satellite thruster valves, for missile fin control, for airplane and helicopter wing and rotor blade adjustments, and for other space and air displacement and control applications thus enables a lower-weight actuation system for a given desired level of performance.

The high bandwidth characteristic of the actuator of the invention, particularly when configured with piezoelectric active stack elements, can be employed for fast-acting and proportional control of the wide range of valves employed in automotive applications, including, e.g., fuel injection systems, braking systems, and heating and cooling systems. Additionally, various automotive control systems such as electronic seat adjustment systems and other automotive control applications are well-addressed by the actuator. Aside from automotive heating and cooling systems, space heating, cooling, and ventilation systems in general are well-addressed by the actuator of the invention, e.g., in proportional control of system valves and cycle mechanisms. Refrigeration systems likewise can employ the actuator in cycle control. The high bandwidth property of the actuator can also be exploited in, e.g., a sound system, for driving a speaker.

The large stroke amplification mechanism of the actuator relative to the actuator size also renders it particularly well-suited for large stroke-small size applications such as computer, e.g., ink jet, print head systems, micro- or macro-positioning and isolation systems for satellite mirrors and optics, active suspension control for precise equipment such as optics and microscope stages or microfabrication equipment such as lithographic exposure stages. As explained earlier, the actuator can be scaled to any reasonable size, so long as considerations for proportional electrical control scaling are heeded. The actuator can be thus be miniaturized using, e.g., conventional micromachining techniques with microfabrication materials such as silicon to produce mezo- and micro-scaled versions for very small-size applications. In such a configuration, it can be recognized that a monolithic expansion element, rather than a stack of expansion wafers, can be employed to longitudinally react against the actuator frames.

This discussion highlights the wide range of applications which are advantageously addressed by the actuator of the invention. Indeed, any application for which a relatively large stroke, low weight, and high bandwidth actuation mechanism is preferred is well-suited for the actuator and is achieved with a high mass efficiency. The precise, repeatable, and highly linear displacement and force generation mechanism of the actuator further enhances its applicability and advantages over prior less mass efficient and more cumbersome actuator configurations. It is recognized, of course, that those skilled in the art may make various modifications and additions to the actuator embodiments described above without departing from the spirit and scope of the present contribution to the art. Accordingly, it is to be understood that the protection sought to be afforded hereby should be deemed to extend to the subject matter of the claims and all equivalents thereof fairly within the scope of the invention.

We claim:

1. An actuator comprising:
   a first frame comprising a distal end member, a proximal pivot end member, and at least two elongated side members connected between the distal end member and the proximal pivot end member of the first frame;
   a second frame comprising a distal end member, a proximal pivot end member, and at least two elongated side members connected between the distal end member and the proximal pivot end member of the second frame;
   a flexure disposed between an end of the pivot end member of the first frame and an end of the pivot end member of the second frame;
   a first longitudinal span member disposed between the distal end member of the second frame and the pivot end member of the first frame; and a second longitudinal span member disposed between the distal end member of the first frame and the pivot end member of the second frame, at least one of the first and second longitudinal span members comprising an expansive element having a longitudinal axis along which dimensional strain can be induced in response to an applied stimulus, the expansive element extending in a state of compression between the corresponding distal and proximal pivot end members, with the longitudinal axis of the element in a plane parallel to side members of the first and second frames.

2. The actuator of claim 1 wherein the expansive element comprises a piezoelectric element.

3. The actuator of claim 1 wherein the expansive element comprises an electrostrictive element.

4. The actuator of claim 1 wherein the expansive element comprises a magnetostrictive element.

5. The actuator of claim 1 wherein each of the first and second longitudinal span members comprise an expansive element having a longitudinal axis along which dimensional strain can be induced in response to an applied stimulus, the expansive element extending in a state of compression between the corresponding distal and proximal pivot end members, with the longitudinal axis of the element in a plane parallel to side members of the first and second frames.

6. The actuator of claim 1 wherein the first and second longitudinal span members are disposed between side members of the first and second frames.

7. The actuator of claim 6 wherein the distal and proximal pivot end members of the second frame are each characterized by a width less than a width characteristic of each of the distal and proximal pivot end members of the first frame, and wherein the side members of the second frame are disposed between the side members of the first frame.

8. The actuator of claim 6 wherein the distal end member of the first frame comprises a mounting end member adapted to be relatively fixedly mounted, and wherein the distal end member of the second frame comprises a displacement end member free to extend and retract along an actuator output stroke path.

9. The actuator of claim 8 wherein the mounting end member of the first frame is adapted to comprise an elongated actuator output stroke track having two separated side members between which is disposed the displacement end member of the second frame.

10. The actuator of claim 7 wherein a longitudinal axis of each of the side members of the second frame is at a preselected angle from the longitudinal axis of the first longitudinal span member, and wherein a longitudinal axis of each of the side members of the first frame is at the preselected angle from the longitudinal axis of the second longitudinal span member, the preselected angle corresponding to a preselected amplification factor relating expansive element stroke to transverse motion of the first frame distal end member relative to the second frame distal end member.

11. The actuator of claim 10 wherein the preselected angle is an acute angle.

12. The actuator of claim 7 wherein the flexure comprises a cylindrical pivot point at the pivot end members of the first and second frames.

13. The actuator of claim 12 wherein the cylindrical pivot point comprises a cylindrical roller pin held in a state of compression between ends of the first and second frame pivot end members.

14. The actuator of claim 7 wherein the flexure comprises a hinge connected between an end of the first frame pivot end member and an end of the second frame pivot end member.

15. The actuator of claim 7 wherein the flexure comprises a flexural support having a first support member connected to the first frame pivot end member, a second support member connected to the second frame pivot end member, a mounting plate, and a flexible strut connected between the mounting plate and each of the first and second support members through corresponding first and second flexural links.

16. The actuator of claim 7 wherein the first longitudinal span member abuts the pivot end member of the first frame with a rolling contact, and wherein the second longitudinal span member abuts the pivot end member of the second frame with a rolling contact.

17. The actuator of claim 16 wherein each rolling contact comprises a cylindrical endcap that abuts the corresponding pivot end member.

18. The actuator of claim 17 wherein the first longitudinal span member comprises an endplate that abuts the distal end member of the second frame, and wherein the second longitudinal span member comprises an endplate that abuts the distal end member of the first frame.

19. The actuator of claim 16 wherein each rolling contact comprises a spherical endcap that abuts the corresponding pivot end member.

20. The actuator of claim 19 wherein the first longitudinal span member comprises a spherical endcap that abuts the distal end member of the second frame, and wherein the second longitudinal span member comprises a spherical endcap that abuts the distal end member of the first frame.

21. The actuator of claim 7 further comprising a pre-load spring connected to bias the first and second longitudinal span members in a state of compression.

22. The actuator of claim 5 wherein each of the first and second expansive elements comprises a magnetostrictive element.

23. The actuator of claim 5 wherein each of the first and second expansive elements comprises an electrostrictive element.

24. The actuator of claim 5 wherein each of the first and second expansive elements comprises a piezoelectric element.

25. The actuator of claim 24 wherein each of the first and second piezoelectric elements comprises a stack of piezoelectric ceramic wafers.

26. The actuator of claim 7 wherein the first and second frames each comprise a frame material characterized by a specific modulus that is greater than a specific modulus characteristic of each of the first and second longitudinal span members.

27. The actuator of claim 7 wherein the first and second frames each comprise a frame material characterized by a coefficient of thermal expansion that is between about 0.5 and about 1.5 times an average of coefficients of thermal expansion characteristic of each of the first and second longitudinal span members.

28. The actuator of claim 27 wherein each of the first and second frames comprises a matrix-fiber composite frame material having a volume fraction of fiber material and a corresponding volume fraction of matrix material selected to produce a frame coefficient of thermal expansion that substantially matches the average of the coefficients of thermal expansion characteristic of each of the first and second longitudinal span members.

29. An actuator comprising:

a first frame comprising a distal end member, a proximal pivot end member, and at least two elongated side members connected between the distal end member and the proximal pivot end member of the first frame;

a second frame disposed between the side members of the first frame and comprising a distal end member, a proximal pivot end member, and at least two elongated side members connected between the distal end member and the proximal pivot end member of the second frame and having a longitudinal axis parallel to a longitudinal axis of the first frame side members;

a pivot point formed at an end of the pivot end member of the first frame and an end of the pivot end member of the second frame;

a first expansive element having a longitudinal axis along which dimensional strain can be induced in response to an applied stimulus, the expansive element extending in a state of compression between the distal end member of the second frame and the proximal pivot end member of the first frame, the longitudinal axis in a plane parallel to longitudinal axes of the side members of the first and second frames; and a second expansive element having a longitudinal axis along which dimensional strain can be induced in response to an applied stimulus, the expansive element extending in a state of compression between the distal end member of the first frame and the proximal pivot end member of the second frame, the longitudinal axis in a plane parallel to longitudinal axes of the side members of the first and second frames.

30. The actuator of claim 29 wherein a longitudinal axis of the side members of the second frame is at a preselected angle from the longitudinal axis of the first expansive element, and wherein a longitudinal axis of the side members of the first frame is at the preselected angle from the longitudinal axis of the second expansive element, the preselected angle corresponding to a preselected amplification factor relating expansive element stroke to transverse motion of the first frame distal end member relative to the second frame distal end member.

31. The actuator of claim 29 wherein the distal end member of the first frame comprises a mounting end member adapted to be relatively fixedly mounted, and wherein the distal end member of the second frame comprises a displacement end member free to extend and retract along an actuator stroke path.

32. An actuator comprising:

a first frame having a distal end and a proximal end pivot point;

a second frame having a distal end and a proximal end pivot point coincident with the pivot point of the first frame; and first and second expansive elements each having a longitudinal axis along which dimensional strain can be induced in response to an applied stimulus, the expansive elements each extending in a state of compression between the first and second frames such that a stimulated change in each expansive element length reacts against a proximal end of a corresponding one of the first and second frames to induce pivoting of the first and second frames relative to each other, resulting in extension of the second frame distal end relative to the first frame distal end in a direction transverse to the longitudinal axes of the expansive elements.

33. The actuator of claim 32 wherein each of the first and second frames forms a preselected angle with respect to a corresponding one of the expansive elements, the preselected angle corresponding to a preselected amplification factor relating expansive element stroke to transverse motion of the first frame distal end member relative to the second frame distal end member.

34. The actuator of claim 32 wherein the distal end of the first frame is relatively fixedly mounted.

35. The actuator of claim 32 further comprising:

a displacement sensor connected along a path of the second frame distal end extension for sensing displacement of a load connected along the path; and a controller connected in a feedback loop between the displacement sensor and the first and second expansive elements for controlling the stimulus applied to each of the first and second expansive elements to produce a desired displacement of the load.

36. The actuator of claim 32 further comprising:

a force sensor in communication with at least one of the first frame and the second frame for sensing force produced by extension of the second frame distal end; and a controller connected in a feedback loop between the force sensor and the first and second expansive elements for controlling the stimulus applied to each of the first and second expansive elements to produce a second frame distal end extension having a desired force.

37. The actuator of claim 32 further comprising:

a displacement sensor connected along a path of the second frame distal end extension for sensing displacement of a load connected along the path;

a force sensor in communication with at least one of the first frame and the second frame for sensing force produced by extension of the second frame distal end; and a controller connected in a feedback loop between the force and displacement sensors and the first and second expansive elements for controlling the stimulus applied to each of the first and second expansive elements to produce a desired second frame distal end extension stiffness.

38. An actuator for controlling a deflectable trailing edge flap of an airfoil, the actuator comprising:

a first frame having a distal end and a proximal end pivot point;

a second frame having a distal end and a proximal end pivot point coincident with the pivot point of the first frame;

a flexural support connected to each of the first and second frame pivot points and mounted to the airfoil, with the first and second frames located within the airfoil;

first and second expansive elements each having a longitudinal axis along which dimensional strain can be induced in response to an applied stimulus, the expansive elements each extending in a state of compression between the first and second frames such that a stimulated change in each expansive element length reacts against a proximal end of one of the first and second frames to induce pivoting of the first and second frames relative to each other, resulting in extension of the second frame distal end with respect to the first frame distal end in a direction transverse to the longitudinal axes of the expansive elements; and a control rod engaged with the distal end of the second frame and extending through the airfoil to engage a lever mounted to the airfoil trailing edge flap.

39. The actuator of claim 38 further comprising a pre-load element connected to bias the first and second expansive elements in a state of compression.

40. The actuator of claim 39 wherein the pre-load element comprises a torsionally pre-stressed wire connected between the airfoil and the trailing edge flap.

41. The actuator of claim 38 wherein the flexural support comprises a centrifugal support having a first support member connected to the first frame, a second support member connected to the second frame, a mounting member, and a flexible strut connected between the mounting plate and each of the first and second support members through corresponding first and second flexural links for distributing centrifugal force equally between the first and second frames.

42. The actuator of claim 38 wherein the distal end of the first frame is adapted to comprise an elongated actuator stroke track having two separated side members between which is disposed the distal end member of the second frame.

\* \* \* \* \*